United States Patent
Izu et al.

(10) Patent No.: US 7,505,587 B2
(45) Date of Patent: Mar. 17, 2009

(54) ELLIPTIC CURVE CRYPTOSYSTEM APPARATUS, STORAGE MEDIUM STORING ELLIPTIC CURVE CRYPTOSYSTEM PROGRAM, AND ELLIPTIC CURVE CRYPTOSYSTEM ARITHMETIC METHOD

(75) Inventors: Tetsuya Izu, Kawasaki (JP); Tsuyoshi Takagi, Ruedesheimer Str. 7, Hofheim-Wallau, 65719 (DE)

(73) Assignees: Fujitsu Limited, Kawasaki (JP); Tsuyoshi Takagi, Hofheim-Wallau (DE)

(*) Notice: Subject to any disclaimer, the term of this patent is extended or adjusted under 35 U.S.C. 154(b) by 771 days.

(21) Appl. No.: 10/315,244

(22) Filed: Dec. 10, 2002

(65) Prior Publication Data

US 2003/0123656 A1  Jul. 3, 2003

(30) Foreign Application Priority Data

Dec. 10, 2001 (JP) ............... 2001-376516

(51) Int. Cl.
*H04L 9/00* (2006.01)
(52) U.S. Cl. ...................... 380/30; 708/491
(58) Field of Classification Search ............ 380/28, 380/30; 708/491
See application file for complete search history.

(56) References Cited

U.S. PATENT DOCUMENTS 6,738,478 B1 * 5/2004 Vanstone et al. ........... 380/28

7,046,801 B2 * 5/2006 Okeya ....................... 380/28

FOREIGN PATENT DOCUMENTS

| EP | 1160661 A2 | 5/2001 |
|---|---|---|
| JP | 2001-290420 | 10/2001 |
| JP | 2001-337599 | 12/2001 |
| WO | WO 99/04531 | 1/1999 |
| WO | WO 99/49386 | 9/1999 |
| WO | WO00/25204 | 5/2000 |

OTHER PUBLICATIONS

Oswald et al., Randomized Addition-Subtraction Chains as a Countermeasure against Power Attack, 2001, 39-50.
Izu et al., A Fast Parallel Elliptic Curve Multiplication Resistant against Side Channel Attacks, 2002, 280-296.
European Patent Office; European Search Report; May 7, 2003, pp. 1-4.
Fischer et al.,; Parallel Scalar Multiplication on General Elliptic Curves over $F_p$ Hedged Against Non-differential Side-Channel Attacks; Jan. 9, 2002.

(Continued)

*Primary Examiner*—Gilberto Barron, Jr.
*Assistant Examiner*—Hadi Armouche
(74) *Attorney, Agent, or Firm*—Staas & Halsey LLP

(57) ABSTRACT

A scalar multiplication can be performed on an elliptic curve cryptosystem at a high speed. P is set as an initial value of Q[0], and 2×P is set as an initial value of Q[1]. An elliptic curve doubling ECDBL of Q[d[i]] is performed, and an arithmetic result is stored in Q[2]. An elliptic curve addition ECADD of Q[0] and Q[1] is performed, and an arithmetic result is stored in Q[1]. Q[2−d[i]] is stored in Q[0]. Q[1+d[i]] is stored in Q[1]. The elliptic curve addition ECADD and the elliptic curve doubling ECDBL are concurrently performed in the respective processors.

12 Claims, 17 Drawing Sheets

OTHER PUBLICATIONS

European Search Report for Appln No. EP 02 25 8503 dated Oct. 17, 2003.

EPO Office Action dated Sep. 6, 2004.

Torii, et al., "Elliptic Curve Cryptosystems", Jul. 1999, pp. 197-201.

Izu, et al. "A Fast Parallel Elliptic Curve Multiplication Resistant against Side Channel Attacks", pp. 280-296, Feb. 12, 2002, D. Naccache, P. Paillie (Eds.), Proceedings of the 4th International Workshop on Practice and Theory in Public Key Cryptosystems (PKC 2002), Lecture Notes in Computer Science (LNCS) vol. 2274, Springer-Verlag, 2002.

Torii, et al., Elliptic Curve Cryptosystems, Jul. 1999, pp. 197-201.

Naccache, et al., Public Key Cryptography, Feb. 2002, pp. 280-296.

Office Action for corresponding European Appln. No. 02 258 503.8 dated Dec. 30, 2005.

Japanese Office Action mailed Apr. 10, 2007 for Japanese Patent Application No. 2001-376516.

Office Action for corresponding Canadian Application No. 2,414,057 dated Jan. 10, 2007.

Office Action dated Apr. 19, 2007 for corresponding European Patent Application No. 02 258 503.8-1229.

* cited by examiner

```
INPUT d, P
OUTPUT d × P
1: Q[0] = P
2: for i=n-2 down to 0
3:     Q[0] = ECDBL(Q[0])
4:     if d[i]==1
5:         Q[0] = ECADD(Q[0],P)
6: return Q[0]
```

FIG. 3

INPUT d, P

OUTPUT d×P

S1: Q[0] = P,   Q[1] = 0

S2: for i=0 to n-1

S3:     Q[2] = ECADD(Q[0],Q[1])

S4:     Q[0] = ECDBL(Q[0])

S5:     Q[1] = Q[1+d[i]]

S6: return Q[1]

FIG. 4

INPUT d, P

OUTPUT d×P

S1: Q[0] = P,   Q[1] = 2×P

S2: for i=n-2 down to 0

S3:   Q[2] = ECDBL(Q[d[i]])

S4:   Q[1] = ECADD(Q[0],Q[1])

S5:   Q[0] = Q[2-d[i]]

S6:   Q[1] = Q[1+d[i]]

S7: return Q[0]

FIG. 5

(1) $T_1 \leftarrow X_1 \times X_2$ (2) $T_2 \leftarrow Z_1 \times Z_2$ (3) $T_3 \leftarrow X_1 \times Z_2$ (4) $T_4 \leftarrow X_2 \times Z_1$ (5) $T_5 \leftarrow a \times T_2 \ (= a\, Z_1\, Z_2)$ (6) $T_6 \leftarrow T_1 - T_5 \ (= X_1 X_2 - a\, Z_1\, Z_2)$ (7) $T_7 \leftarrow T_6{}^2 \ (= (X_1 X_2 - a\, Z_1\, Z_2)^2)$ (8) $T_8 \leftarrow b \times T_2 \ (= b\, Z_1\, Z_2)$ (9) $T_9 \leftarrow 4 \times T_8 \ (= 4\, b\, Z_1\, Z_2)$

(10) $T_{10} \leftarrow T_3 + T_4 \ (= X_1 Z_2 + X_2 Z_1)$

(11) $T_{11} \leftarrow T_9 \times T_{10} \ (= 4\, b\, Z_1\, Z_2\, (X_1 Z_2 + X_2 Z_1))$

(12) $T_{12} \leftarrow T_7 - T_{11} \ (= (X_1 X_2 - a\, Z_1\, Z_2)^2 - 4\, b\, Z_1\, Z_2 (X_1 Z_2 + X_2 Z_1))$

(13) $X_3 \leftarrow Z_3' \times T_{12}$

(14) $T_{13} \leftarrow T_3 - T_4 \ (= X_1 Z_2 - X_2 Z_1)$

(15) $T_{14} \leftarrow T_{13}{}^2 \ (= (X_1 Z_2 - X_2 Z_1)^2)$

(16) $Z_3 \leftarrow X_3' \times T_{14}$

F I G. 8

$T1 \leftarrow X1 \times X2$ $T2 \leftarrow Z1 \times Z2$ $T3 \leftarrow X1 \times Z2$ $T4 \leftarrow X2 \times Z1$ $T5 \leftarrow a \times T2 \ (= a\ Z1\ Z2)$ $T6 \leftarrow T1 - T5 \ (= X1\ X2 - a\ Z1\ Z2)$ $T7 \leftarrow T6\hat{\ }2 \ (= (X1\ X2 - a\ Z1\ Z2)\hat{\ }2)$ $T8 \leftarrow b \times T2 \ (= b\ Z1\ Z2)$ $T9 \leftarrow 4 \times T8 \ (= 4\ b\ Z1\ Z2)$ $T10 \leftarrow T3 + T4 \ (= X1\ Z2 + X2\ Z1)$ $T11 \leftarrow T9 \times T10 \ (= 4\ b\ Z1\ Z\ 2\ (X1\ Z2 + X2\ Z1))$ $X3 \leftarrow T7 - T11 \ (= (X1\ X2 - a\ Z1\ Z2)\hat{\ }2 - 4\ b\ Z1\ Z2(X1\ Z2 + X2\ Z1))$ $T13 \leftarrow T3 - T4 \ (= X1\ Z2 - X2\ Z1)$ $T14 \leftarrow T13\hat{\ }2 \ (= (X1\ Z2 - X2\ Z1)\hat{\ }2)$ $Z3 \leftarrow X3' \times T14$

FIG. 9

(1) $T1 \leftarrow X1 \times X2$ (2) $T2 \leftarrow Z1 \times Z2$ (3) $T3 \leftarrow X1 \times Z2$ (4) $T4 \leftarrow X2 \times Z1$ (5) $T5 \leftarrow T3+T4 \ (= X1\ Z2 + X2\ Z1)$ (6) $T6 \leftarrow a \times T2 \ (= a\ Z1\ Z2)$ (7) $T7 \leftarrow T1+T6 \ (= X1\ X2 + a\ Z1\ Z2)$ (8) $T8 \leftarrow T5 \times T7 \ (= (X1\ Z2 + X2\ Z1)(X1\ X2 + a\ Z1\ Z2))$ (9) $T9 \leftarrow 2 \times T8 \ (= 2\ (X1\ Z2 + X2\ Z1)(X1\ X2 + a\ Z1\ Z2))$

(10) $T10 \leftarrow T2\char`\^2 \ (= Z1\char`\^2\ Z2\char`\^2)$

(11) $T11 \leftarrow b \times T10 \ (= b\ Z1\char`\^2\ Z2\char`\^2)$

(12) $T12 \leftarrow 4 \times T11 \ (= 4\ b\ Z1\char`\^2\ Z2\char`\^2)$

(13) $T13 \leftarrow T9+T12 \ (= 2(X1\ Z2 + X2\ Z1)(X1\ X2 + a\ Z1\ Z2)+ 4\ b\ Z1\char`\^2\ Z2\char`\^2)$

(14) $T14 \leftarrow T3-T4 \ (= X1\ Z2 - X2\ Z1)$

(15) $T15 \leftarrow T14\char`\^2 \ (= (X1\ Z2 - X2\ Z1)\char`\^2)$

(16) $T16 \leftarrow Z3' \times T13$

(17) $T17 \leftarrow X3' \times T15$

(18) $X3 \leftarrow T16-T17$

(19) $Z3 \leftarrow Z3' \times T15$

FIG. 10

$T1 \leftarrow X1 \times X2$ $T2 \leftarrow Z1 \times Z2$ $T3 \leftarrow X1 \times Z2$ $T4 \leftarrow X2 \times Z1$ $T5 \leftarrow T3+T4 \ (= X1\ Z2 + X2\ Z1)$ $T6 \leftarrow a \times T2 \ (= a\ Z1\ Z2)$ $T7 \leftarrow T1+T6 \ (= X1\ X2 + a\ Z1\ Z2)$ $T8 \leftarrow T5 \times T7 \ (= (X1\ Z2 + X2\ Z1)(X1\ X2 + a\ Z1\ Z2))$ $T9 \leftarrow 2 \times T8 \ (= 2\ (X1\ Z2 + X2\ Z1)(X1\ X2 + a\ Z1\ Z2))$ $T10 \leftarrow T2\verb|^|2 \ (= Z1\verb|^|2\ Z2\verb|^|2)$ $T11 \leftarrow b \times T10 \ (= b\ Z1\verb|^|2\ Z2\verb|^|2)$ $T12 \leftarrow 4 \times T11 \ (= 4\ b\ Z1\verb|^|2\ Z2\verb|^|2)$ $T13 \leftarrow T9+T12 \ (= 2(X1\ Z2 + X2\ Z1)(X1\ X2 + a\ Z1\ Z2) + 4\ b\ Z1\verb|^|2\ Z2\verb|^|2)$ $T14 \leftarrow T3-T4 \ (= X1\ Z2 - X2\ Z1)$ $T15 \leftarrow T14\verb|^|2 \ (= (X1\ Z2 - X2\ Z1)\verb|^|2)$ $T16 \leftarrow T13$ $T17 \leftarrow X3' \times T15$ $X3 \leftarrow T16-T17$ $Z3 \leftarrow T15$

F I G. 1 1

(1) $T1 \leftarrow X1^2$ (2) $T2 \leftarrow Z1^2$ (3) $T3 \leftarrow a \times T2 \ (= a\, Z1^2)$ (4) $T4 \leftarrow T1-T3 \ (= X1^2 - a\, Z1^2)$ (5) $T5 \leftarrow T4^2 (= (X1^2 - a\, Z1^2)^2)$ (6) $T6 \leftarrow b \times T2 \ (= b\, Z1^2)$ (7) $T7 \leftarrow X1 \times Z1 \ (= X1\, Z1)$ (8) $T8 \leftarrow T6 \times T7 \ (= b\, X1\, Z1^3)$ (9) $T9 \leftarrow 8 \times T8 \ (= 8\, b\, X1\, Z1^3)$

(10) $X4 \leftarrow T5-T9$

(11) $T10 \leftarrow T1+T3 \ (= X1^2 + a\, Z1^2)$

(12) $T11 \leftarrow T7 \times T10 \ (= X1\, Z1\, (X1^2 + a\, Z1^2))$

(13) $T12 \leftarrow T6 \times T2 \ (= b\, Z1^4)$

(14) $T13 \leftarrow T11+T12 \ (= X1\, Z1\, (X1^2 + a\, Z1^2) + b\, Z1^4))$

(15) $Z4 \leftarrow 4 \times T13$

F I G. 1 2

(1) $T1 \leftarrow Z[d]^2$ (2) $T2 \leftarrow T1 \times Z[d+1]$ $(= Z[d]^2 \, Z[d+1])$ (3) $T3 \leftarrow y \times T2$ $(= y \, Z[d]^2 \, Z[d+1])$ (4) $T4 \leftarrow X[d] \times T3$ $(= y \, Z[d]^2 \, Z[d+1] \, X[d])$ (5) $X'[d] \leftarrow 2 \times T4$ (6) $T5 \leftarrow Z[d] \times T3$ $(= y \, Z[d]^2 \, Z[d+1] \, Z[d])$ (7) $Z'[d] \leftarrow 2 \times T5$ (8) $T6 \leftarrow X[d]^2$ (9) $T7 \leftarrow a \times T1$ $(= a \, Z[d]^2)$

(10) $T8 \leftarrow T6 + T7$ $(= X[d]^2 + a \, Z[d]^2)$

(11) $T9 \leftarrow X[d] \times Z[d+1]$

(12) $T10 \leftarrow T9 \times T8$ $(= X[d] \, Z[d+1] \cdot (X[d]^2 + a \, Z[d]^2))$

(13) $T11 \leftarrow y \times T5$ $(= y^2 \, Z[d]^3 \, Z[d+1])$

(14) $T12 \leftarrow b \times Z[d]$

(15) $T13 \leftarrow T12 \times T2$ $(= b \, Z[d]^3 \, Z[d+1])$

(16) $T14 \leftarrow x \times Z[d]$

(17) $T15 \leftarrow T14 - X[d]$ $(= x \, Z[d] - X[d])$

(18) $T16 \leftarrow T15^2$ $(= (x \, Z[d] - X[d])^2)$

(19) $T17 \leftarrow T14 \times Z[d+1]$ $(= x \, Z[d] \, Z[d+1])$

(20) $T18 \leftarrow X[d+1] \times Z[d]$

(21) $T19 \leftarrow T17 + T9 + T18$

(22) $T20 \leftarrow T16 \times T19$

(23) $Y'[d] \leftarrow T10 + T11 + T13 - T20$

FIG. 13

(1) $T1 \leftarrow X1 \times X2$
(2) $T2 \leftarrow Z1 \times Z2$
(3) $T3 \leftarrow X1 \times Z2$
(4) $T4 \leftarrow X2 \times Z1$
(5) $T5 \leftarrow T3+T4 \; (= X1\,Z2 + X2\,Z1)$
(6) $T6 \leftarrow a \times T2 \; (= a\,Z1\,Z2)$
(7) $T7 \leftarrow T1+T6 \; (= X1\,X2 + a\,Z1\,Z2)$
(8) $T8 \leftarrow T5 \times T7 \; (= (X1\,Z2 + X2\,Z1)(X1\,X2 + a\,Z1\,Z2))$
(9) $T9 \leftarrow 2 \times T8 \; (= 2(X1\,Z2 + X2\,Z1)(X1\,X2 + a\,Z1\,Z2))$
(10) $T10 \leftarrow T2\hat{\,}2 \; (= Z1\hat{\,}2\,Z2\hat{\,}2)$
(11) $T11 \leftarrow b \times T10 \; (= b\,Z1\hat{\,}2\,Z2\hat{\,}2)$
(12) $T12 \leftarrow 4 \times T11 \; (= 4\,b\,Z1\hat{\,}2\,Z2\hat{\,}2)$
(13) $T13 \leftarrow T9+T12 \; (= 2(X1\,Z2 + X2\,Z1)(X1\,X2 + a\,Z1\,Z2) + 4\,b\,Z1\hat{\,}2\,Z2\hat{\,}2)$
(14) $T14 \leftarrow T3-T4 \; (= X1\,Z2 - X2\,Z1)$
(15) $T15 \leftarrow T14\hat{\,}2 \; (= (X1\,Z2 - X2\,Z1)\hat{\,}2)$
(16) $T16 \leftarrow Z3' \times T13$
(17) $T17 \leftarrow X3' \times T15$
(18) $X3 \leftarrow T16-T17$
(19) $Z3 \leftarrow Z3' \times T15$
(20) $T21 \leftarrow T3\hat{\,}2 \; (= X1\hat{\,}2\,Z2\hat{\,}2)$
(21) $T22 \leftarrow T6 \times T2 \; (= a\,Z1\hat{\,}2\,Z2\hat{\,}2)$
(22) $T23 \leftarrow T21-T22 \; (= X1\hat{\,}2\,Z2\hat{\,}2 - a\,Z1\hat{\,}2\,Z2\hat{\,}2)$
(23) $T24 \leftarrow T23\hat{\,}2 \; (= (X1\hat{\,}2\,Z2\hat{\,}2 - a\,Z1\hat{\,}2\,Z2\hat{\,}2)\hat{\,}2)$
(24) $T25 \leftarrow T11$
(25) $T26 \leftarrow T25 \times T2 \; (= b\,Z1\hat{\,}3\,Z2\hat{\,}3)$
(26) $T27 \leftarrow T26 \times T3 \; (= b\,X1\,Z1\hat{\,}3\,Z2\hat{\,}4)$
(27) $T28 \leftarrow 8 \times T27 \; (= 8\,b\,X1\,Z1\hat{\,}3\,Z2\hat{\,}4)$
(28) $X4 \leftarrow T24-T28$
(29) $T29 \leftarrow T21+T22 \; (= X1\hat{\,}2\,Z2\hat{\,}2 + a\,Z1\hat{\,}2\,Z2\hat{\,}2)$
(30) $T30 \leftarrow T3 \times T29 \; (= X1\,Z2\,(X1\hat{\,}2\,Z2\hat{\,}2 + a\,Z1\hat{\,}2\,Z2\hat{\,}2))$
(31) $T31 \leftarrow T30+T26$
(32) $T32 \leftarrow T2 \times T31$
(33) $Z4 \leftarrow 4 \times T32$

FIG. 14

$T1 \leftarrow X1 \times X2$ $T2 \leftarrow Z1 \times Z2$ $T3 \leftarrow X1 \times Z2$ $T4 \leftarrow X2 \times Z1$ $T5 \leftarrow T3+T4 \ (= X1\ Z2 + X2\ Z1)$ $T6 \leftarrow a \times T2 \ (= a\ Z1\ Z2)$ $T7 \leftarrow T1+T6 \ (= X1\ X2 + a\ Z1\ Z2)$ $T8 \leftarrow T5 \times T7 \ (= (X1\ Z2 + X2\ Z1)(X1\ X2 + a\ Z1\ Z2))$ $T9 \leftarrow 2 \times T8 \ (= 2\ (X1\ Z2 + X2\ Z1)(X1\ X2 + a\ Z1\ Z2))$ $T10 \leftarrow T2\hat{\ }2 \ (= Z1\hat{\ }2\ Z2\hat{\ }2)$ $T11 \leftarrow b \times T10 \ (= b\ Z1\hat{\ }2\ Z2\hat{\ }2)$ $T12 \leftarrow 4 \times T11 \ (= 4\ b\ Z1\hat{\ }2\ Z2\hat{\ }2)$ $T13 \leftarrow T9+T12 \ (= 2(X1\ Z2 + X2\ Z1)(X1\ X2 + a\ Z1\ Z2)+ 4\ b\ Z1\hat{\ }2\ Z2\hat{\ }2)$ $T14 \leftarrow T3-T4 \ (= X1\ Z2 - X2\ Z1)$ $T15 \leftarrow T14\hat{\ }2 \ (= (X1\ Z2 - X2\ Z1)\hat{\ }2)$ $T16 \leftarrow T13$ $T17 \leftarrow X3' \times T15$ $X3 \leftarrow T16-T17$ $Z3 \leftarrow T15$ $T21 \leftarrow T3\hat{\ }2 \ (= X1\hat{\ }2\ Z2\hat{\ }2\ )$ $T22 \leftarrow T6 \times T2 \ (= a\ Z1\hat{\ }2\ Z2\hat{\ }2\ )$ $T23 \leftarrow T21-T22 \ (= X1\hat{\ }2\ Z2\hat{\ }2 - a\ Z1\hat{\ }2\ Z2\hat{\ }2\ )$ $T24 \leftarrow T23\hat{\ }2 \ (= (X1\hat{\ }2\ Z2\hat{\ }2 - a\ Z1\hat{\ }2\ Z2\hat{\ }2)\hat{\ }2\ )$ $T25 \leftarrow T11$ $T26 \leftarrow T25 \times T2 \ (= b\ Z1\hat{\ }3\ Z2\hat{\ }3\ )$ $T27 \leftarrow T26 \times T3 \ (= b\ X1\ Z1\hat{\ }3\ Z2\hat{\ }4\ )$ $T28 \leftarrow 8 \times T27 \ (= 8\ b\ X1\ Z1\hat{\ }3\ Z2\hat{\ }4\ )$ $X4 \leftarrow T24-T28$ $T29 \leftarrow T21+T22 \ (= X1\hat{\ }2\ Z2\hat{\ }2 + a\ Z1\hat{\ }2\ Z2\hat{\ }2\ )$ $T30 \leftarrow T3 \times T29 \ (= X1\ Z2\ (X1\hat{\ }2\ Z2\hat{\ }2 + a\ Z1\hat{\ }2\ Z2\hat{\ }2)\ )$ $T31 \leftarrow T30+T26$ $T32 \leftarrow T2 \times T31$ $Z4 \leftarrow 4 \times T32$

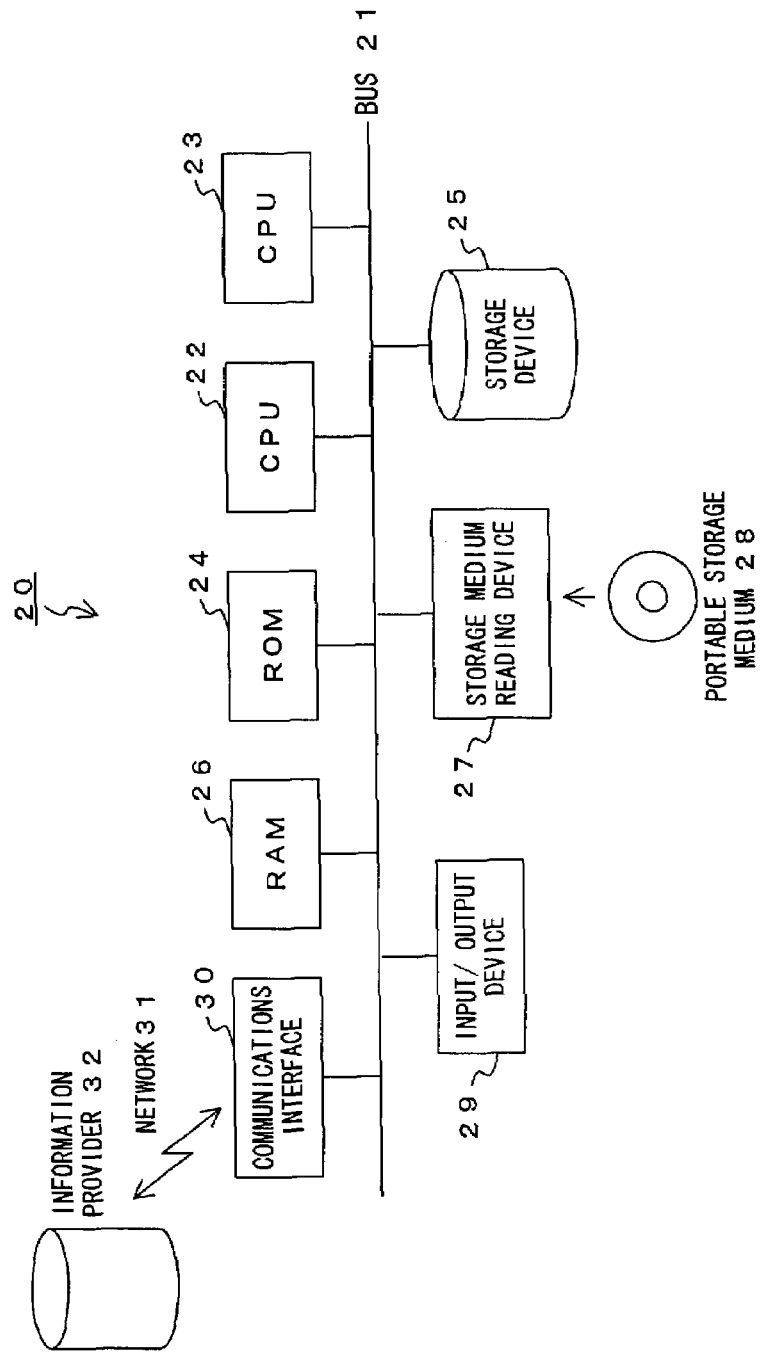
F I G. 17

ELLIPTIC CURVE CRYPTOSYSTEM APPARATUS, STORAGE MEDIUM STORING ELLIPTIC CURVE CRYPTOSYSTEM PROGRAM, AND ELLIPTIC CURVE CRYPTOSYSTEM ARITHMETIC METHOD

BACKGROUND OF THE INVENTION

1. Field of the Invention

The present invention relates to an elliptic curve cryptosystem apparatus, a storage medium storing an elliptic curve cryptosystem program, and an elliptic curve cryptosystem arithmetic method.

2. Description of the Related Art

An elliptic curve cryptosystem is one of the public key cryptosystem, and is used in the processes of encryption, decryption, signature generation, authentication, etc.

Assuming that p indicates a prime number equal to or larger than 2, and m indicates a natural number equal to or larger than 1, the Weierstrass form elliptic curve over the finite field GF(q) with q=p^m elements is a group obtained by adding the point ∞ referred to as a point at infinity to the group of points (x, y) satisfying the following equation:

$$E: y^2 + a1 \times x \times y + a3 \times y = x^3 + a2 \times x^2 + a4 \times x + a6 \text{ (^ indicates a power)}$$

The point at infinity ∞ can also be represented by 0.

In the equation, a1, a2, a3, a4, a6, x, and y are elements of the GF (q). Especially, when p is a prime number equal to or larger than 5, the Weierstrass form elliptic curve in the GF(p^m) is a group obtained by adding the point referred to as a point at infinity to the group of points (x, y) satisfying the following equation:

$$E: y\hat{0}2 = x^3 + a \times x + b$$

The point at infinity ∞ can also be represented by 0.

In the equation, a, b, x, and y are elements of the GF (p^m), and satisfy $4 \times a^3 + 27 \times b^2 \neq 0$. The point at infinity ∞ is a point which cannot be represented in the (x, y) coordinate system.

Assume that P indicates a point on the Weierstrass form elliptic curve E in the GF (p^m). The inverse –P is defined as follows:

(1) if P=∞ then –P=∞

(2) if P≠∞ then the following equation holds for P=(x, y)

$$-P=(x,-y)$$

P1 and P2 are assumed to be two points on the Weierstrass form elliptic curve E. Then, the sum of P1 and P2 is defined as P3=P1+P2 as follows:

(1) if P1=∞ then P3=P2

(2) if P2=then P3=P1

(3) if P1=–P2 then P3=∞

(4) if P1≠P2, then the following equation holds for P1=(x1, y1), P2=(x2, y2), P3=(x3, y3), $$x3=\lambda^2-x1-x2, \quad y3=\lambda \times (x1-x3)-y1,$$

where $\lambda=(y2-y1)/(x2-x1)$ when P1≠P2, and $\lambda=(3 \times x1^2+a)/(2 \times y1)$ when P1=P2

Computing P1+P2 when P1≠P2 is referred to as elliptic curve addition ECADD, and computing P1+P2=2×P1 when P1=P2 is referred to as elliptic curve doubling ECDBL.

FIGS. 1 and 2 are explanatory views of the elliptic curve addition and the elliptic curve doubling. The elliptic curve addition is performed to obtain the point P3=P1+P2=(x3, y3) by turning the intersection point of the straight line connecting the point P1=(x1, y1) on the elliptic curve to the point P2=(x2, y2) on the elliptic curve over the x axis as shown in FIG. 1. The values of x3 and y3 can be represented by the following equations:

$$x3=\{(y1-y2)/(x1-x2)\}^2-x1-x2$$

(^ indicates a power)

$$y3=\{(y1-y2)/(x1-x2)\}(x1-x3)-y1$$

The elliptic curve doubling is performed to obtain the point P4=2×P1=(x4, y4) by turning the intersection point of the tangent at the point P1=(x1, y1) on the elliptic curve over the x axis as shown in FIG. 2. The values of x4 and y4 can be represented by the following equations:

$$x4=\{(3 \times x1^2+a)/(2 \times y1)\}^2-2 \times x1$$

$$y4=\{(3 \times x1^2+a)/(2 \times y1)\}(x1-x4)-y1$$

Scalar multiplication refers to computing the point d×P=P+P+ . . . +P (sum taken d times) for the elliptic curve over the finite field, for the point P on the curve, and for the integer (also referred to as a scalar) d. The scalar multiplication is represented by a combination of the elliptic curve addition and the elliptic curve doubling.

The computation time of the elliptic curve addition, the elliptic curve doubling, and the scalar multiplication can be frequently estimated by a sum of the computation times of multiplication, squaring, and inversion in the GF(q). This is because the practical computations of elliptic curve addition, elliptic curve doubling, and scalar multiplication are a combination of addition, subtraction, multiplication, squaring, and inversion in the GF(q), and in many cases, the computation time of multiplication by addition, subtraction, and constant is comparatively shorter than the computation time of other processes, and can be ignored. For example, the above mentioned elliptic curve addition requires two multiplying operations, one squaring operation, and one inversion operation in the GF (p^m). These operations are represented by 2M+1S+1I.

Normally, the computation time of the inversion in the GF(p^m) is much longer than that of the multiplication and squaring. Therefore, in the actual scalar multiplication, projective coordinates are used in representing a point on an elliptic curve. In the projective coordinate system, a point is represented by a combination of three elements in the GF (p^m) such as (X:Y:Z). However, it is assumed that (X:Y:Z) is the same point as (r×X:r×Y:r×Z) for the element r in the GF(p^m) where r≠0. In the projective coordinate system, the Weierstrass form elliptic curve is represented as follows:

$$E: Y^2 \times Z = X^3 + a \times X \times Z^2 + b \times Z^3$$

where x=X/Z, and y=Y/Z is substituted. The point at infinity is represented by ∞=(0:1:0). In the projective coordinate system, there are standard algorithms in which the elliptic curve addition can be computed by 12M+2S, and the elliptic curve doubling can be computed by 7M+5S. Additionally, there are improved projective coordinate systems such as Jacobian coordinates, Chudonovsky coordinates, modified Jacobian coordinates, etc.

On the other hand, a group of points (u, v) satisfying the equation:

$$B \times v^2 = u^3 + A \times u^2 + u$$

for the elements A and B in the GF(p^m), and a group of the points referred to as points at infinity ∞ are referred to as a Montgomery form elliptic curve. In the projective coordinate system, a point is represented as a set (U:V:W) of three elements in the $GF(p\hat{}m)$, and a curve is represented by the following equation:

$$B \times V\hat{}2 \times W = U\hat{}3 + A \times U\hat{}2 \times W + U \times W\hat{}2$$

The point at infinity is represented by $\infty=(0:1:0)$. The formulas of elliptic curve addition and elliptic curve doubling as well as the Weierstrass form elliptic curve are well known.

Since the scalar multiplication on an elliptic curve is represented by a combination of arithmetics of the elliptic curve addition (ECADD) and the elliptic curve doubling (ECDBL), the entire computation time is evaluated based on the number of times of the arithmetics performed. The computation of the point d×P processed by the scalar multiplication is performed using the binary expression of d represented by the equation:

$$d = d[n-1] \times 2\hat{}(n-1) + d[n-2] \times 2\hat{}(n-2) + \ldots + d[1] \times 2 + d[0]$$

FIG. 3 shows the algorithm 1 of the conventional scalar multiplication.

In FIG. 3, P indicates the initial value of the variable Q[0], the elliptic curve doubling is performed on the point Q[0] in step 3, and an arithmetic result is stored in the Q[0]. If d[i]==1, the elliptic curve addition ECADD is performed on the point Q[0] and the point P in step 5, and the arithmetic result is stored in the point Q[0].

The computation time required in the scalar multiplication of the algorithm 1 is $(n-1)/2 \times E$ CADD+$(n-1) \times$ECDBL on average. The binary method can be replaced with the signed binary method so as to shorten the average computation time into $(n-1)/3 \times$ECADD+$(n-1) \times$ECDBL.

To make the elliptic curve cryptosystem be widespread in the current world, it is necessary to save the resources (memory, circuit amount, etc.) required in the processing time and implementation. In the elliptic curve cryptosystem, an arithmetic referred to as scalar multiplication is commonly used, and is more popularly used in the entire encryption and decryption process. Therefore, the performance of the entire encryption and decryption totally depend on the performance of this portion. Since the scalar multiplication process is a major process in the elliptic curve cryptosystem, it is desired that higher performance can be realized by the scalar multiplication.

However, in the arithmetic method of the above mentioned algorithm 1, it is necessary to perform the elliptic curve addition ECADD based on the arithmetic result Q[0] of the elliptic curve doubling ECDBL, and the shortening of the computation time of the scalar multiplication is limited.

Furthermore, since the elliptic curve cryptosystem can guarantee the security using a key length shorter than a conventional cryptosystem, it has become widespread in such low-power devices as smart cards, etc. However, the side channel attacks can be effective on these devices, and an algorithm of the scalar multiplication resistant to the attacks is required.

SUMMARY OF THE INVENTION

The object of the present invention is to perform the scalar multiplication on the elliptic curve cryptosystem at a higher speed. Another object of the present invention is to improve the resistance to the side channel attacks to the elliptic curve cryptosystem.

The elliptic curve cryptosystem apparatus according to the present invention performs the scalar multiplication on a natural number and a base point P set on the elliptic curve E, and includes: a storage unit for storing an elliptic curve over the finite field as the elliptic curve E, an n-bit natural number d, and the base point P; and an arithmetic unit for obtaining the d-multiplication point d×P of the point P in the scalar multiplication by the concurrent computation of the elliptic curve addition and the elliptic curve doubling.

According to the invention, the elliptic curve addition and the elliptic curve doubling can be concurrently performed. Therefore, the computation time for the scalar multiplication can be considerably shortened.

Another elliptic curve cryptosystem apparatus according to the present invention includes: an obtaining unit for obtaining the coordinates of the point P on an elliptic curve over the finite field and an n-bit natural number d; and an arithmetic unit for concurrently performing the elliptic curve addition ECADD and the elliptic curve doubling ECDBL when d×P is computed by repeating a predetermined number of times the arithmetics (1) through (3) below based on the coordinate of the point P and the natural number d obtained by the obtaining unit.

$$Q[2] = ECADD(Q[0], Q[1]) \tag{1}$$

$$Q[0] = ECDBL(Q[0]) \tag{2}$$

$$Q[1] = Q[1 + d[i]] \tag{3}$$

where the initial value of the variable Q[0] is P, the initial value of the variable Q[1] is 0, and the coefficient in the binary expression on the natural number d obtained by the obtaining unit is d[i] (d[i]=0, 1).

According to the invention, the elliptic curve addition ECADD and the elliptic curve doubling ECDBL can be concurrently performed. Therefore, the computation time for the scalar multiplication can be considerably shortened. Furthermore, for example, the elliptic curve addition ECADD and the elliptic curve doubling ECDBL can be performed independent of d[i] in the arithmetics (1) through (3) above, thereby improving the resistance to the side attacks.

Furthermore, the elliptic curve cryptosystem apparatus according to the present invention includes an obtaining unit for obtaining the coordinates of the point P on an elliptic curve over the finite field and an n-bit natural number d; and an arithmetic unit for concurrently performing the elliptic curve addition ECADD and the elliptic curve doubling ECDBL when d×P is computed by repeating a predetermined number of times the arithmetics (1) through (4) below based on the coordinate of the point P and the natural number d obtained by the obtaining unit.

$$Q[2] = ECDBL(Q[d[i]]) \tag{1}$$

$$Q[1] = ECADD(Q[0], Q[1]) \tag{2}$$

$$Q[0] = Q[2 - d[i]] \tag{3}$$

$$Q[1] = Q[1 + d[i]] \tag{4}$$

where the initial value of the variable Q[0] is P, the initial value of the variable Q[1] is 2×P, and the coefficient in the binary expression on the natural number d obtained by the obtaining unit is d[i] (d[i]=0, 1).

According to the invention, the elliptic curve addition ECADD and the elliptic curve doubling ECDBL can be concurrently performed. Therefore, the computation time for the scalar multiplication can be considerably shortened. Furthermore, for example, the elliptic curve addition ECADD and the elliptic curve doubling ECDBL can be performed independent of d[i] in the arithmetics (1) through (4) above, thereby improving the resistance to the side attacks.

According to the above mentioned invention, the arithmetic unit includes a first register for storing Q[0], and a second register for storing Q[1]. After setting the initial value P of Q[0] in the first register, and the initial value 2×P of Q[1] in the second register, the elliptic curve addition ECADD and the elliptic curve doubling ECDBL are performed. If d[i]=0, an arithmetic result of the elliptic curve doubling ECDBL can be stored in the first register, and an arithmetic result of the elliptic curve addition ECADD can be stored in the second register. If d[i]=1, an arithmetic result of the elliptic curve doubling ECDBL can be stored in the second register, and an arithmetic result of the elliptic curve addition ECADD can be stored in the first register.

A further elliptic curve cryptosystem apparatus according to the present invention includes: an obtaining unit for obtaining the x coordinate x1 of the point P1 on the elliptic curve over the finite field, the x coordinate x2 of the point P2, and the x coordinate x3' of the point P3'=P1−P2; and an arithmetic unit for computing the x coordinate x3 of the point P3 in the elliptic curve addition P3=P1+P2 without using the y coordinate by the following equation:

$$x3=[(x1 \times x2-a)^2-4 \times b \times (x1+x2)]/[x3' \times (x1-x2)^2]$$

According to the invention, the x coordinate of the point P3 of the elliptic curve addition can be computed without using the y coordinates, thereby shortening the computation time.

A further elliptic curve cryptosystem apparatus according to the present invention includes: an obtaining unit for obtaining the x coordinate x1 of the point P1 of the elliptic curve over the finite field; and an arithmetic unit for computing the x coordinate x4 of the elliptic curve doubling P4=2×P1 without using the y coordinate by the following equation:

$$x4=[(x1^2-a)^2-8 \times b \times x1]/[4 \times (x1^{\,}3+a \times x1+b)]$$

According to the invention, the x coordinate of the point P4 of the elliptic curve doubling can be computed without using the y coordinates, thereby shortening the computation time.

A further elliptic curve cryptosystem apparatus of the present invention includes: an obtaining unit for obtaining the X coordinate X1 and the Z coordinate Z1 of the point P1 in the projective coordinate on the elliptic curve over the finite field, the X coordinate X2 and the Z coordinate Z2 of the point P2, and the X coordinate X3' and the Z coordinate Z3' of the point P3'=P1−P2; and an arithmetic unit for computing the x coordinate X3 and the Z coordinate Z3 of the elliptic curve addition P3=P1+P2 in the projective coordinate without using the Y coordinate by the equations (1) and (2) below based on the X coordinates and the Z coordinates of the points P1, P2, and P3' obtained by the obtaining unit.

$$X3=Z3' \times [2(X1 \times Z2+X2 \times Z1) \times (X1 \times X2+aZ1 \times Z2)+ 4bZ1^2 \times Z2^2]-X3' \times [(X1 \times Z2-X2 \times Z1)^2] \quad (1)$$

$$Z3=Z3' \times [(X1 \times Z2-X2 \times Z1)^2] \quad (2)$$

where Z3'≠0, X1×Z2≠X2×Z1.

According to the invention, the X coordinate and the Z coordinate can be computed in the projective coordinate of the elliptic curve addition P3 without using the Y coordinate of the projective coordinate, thereby shortening the computation time.

A further elliptic curve cryptosystem apparatus according to the present invention includes: an obtaining unit for obtaining the X coordinate X1 and the Z coordinate Z1 in the projective coordinate of the point P1 on the elliptic curve over the finite field; and an arithmetic unit for computing the coordinate of the point P1 obtained by the obtaining unit and the X coordinate X4 and the Z coordinate Z4 of the elliptic curve doubling P4=2×P1 in the projective coordinate without using the Y coordinate by the equations (1) and (2) below.

$$X4=(X1^2-a \times Z1^2)^2-8 \times b \times X1 \times Z1^{\,}3; \text{(}^{\,}\text{ indicates a power)} \quad (1)$$

$$Z4=4 \times (X1 \times Z1 \times (X1^2+a \times Z1^2)+b \times Z1^{\,}4) \quad (2)$$

where Z1≠0.

According to the invention, the X coordinate and the Z coordinate can be computed in the projective coordinate of the elliptic curve doubling P4 without using the Y coordinate of the projective coordinate, thereby shortening the computation time.

BRIEF DESCRIPTION OF THE DRAWINGS

FIG. 3 shows a program of the algorithm 1;
FIG. 4 shows a program of the algorithm 2;
FIG. 5 shows a program of the algorithm 3;
FIG. 8 shows a practical arithmetic program according to the sixth embodiment of the present invention;
FIG. 9 shows a practical arithmetic program according to the sixth embodiment when Z3'=1;
FIG. 10 shows a practical arithmetic program according to the seventh embodiment;
FIG. 11 shows a practical arithmetic program according to the seventh embodiment when Z3'=1;
FIG. 12 shows a practical arithmetic program according to the eighth embodiment;
FIG. 13 shows a practical arithmetic program according to the tenth embodiment;
FIG. 14 shows an arithmetic program of ECADDDBL;
FIG. 15 shows the arithmetic program of the ECADDDBL when Z3'=1;
FIG. 16 shows an arithmetic program according to the fifteenth embodiment of the present invention;
and
FIG. 17 shows the hardware environment for executing an arithmetic program according to the embodiments of the present invention.

DESCRIPTION OF THE PREFERRED EMBODIMENTS

Figure 1:
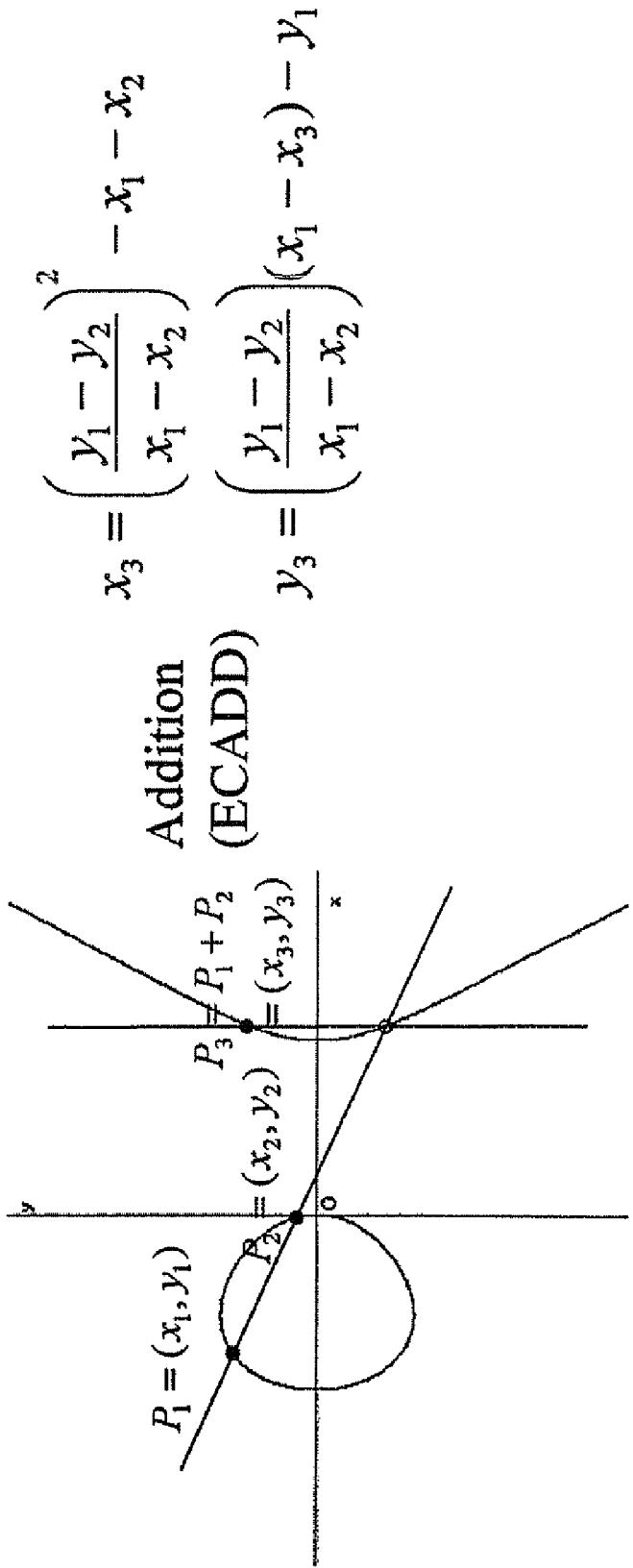
FIG. 1 is an explanatory view of an elliptic curve addition.
Figure 2:
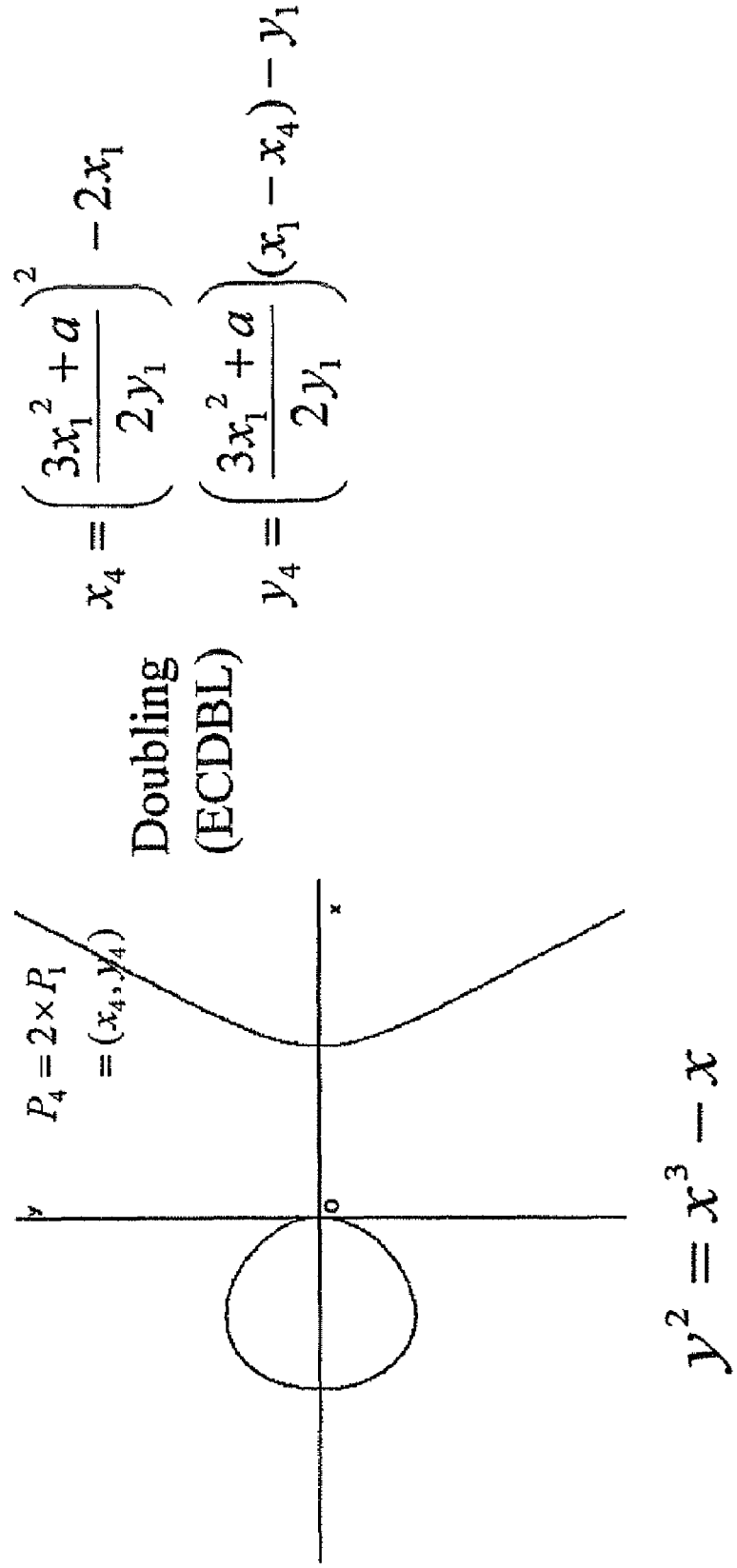
FIG. 2 is an explanatory view of an elliptic curve doubling.

The embodiments of the present invention are described below by referring to the attached drawings. The elliptic curve cryptosystem apparatus according to an embodiment of the present invention comprises, for example, an information processing device exclusive for elliptic curve cryptosystem, a personal computer, an IC chip built in an smart card, etc., a mobile phone, a mobile information terminal device (PDA, etc.), a DVD player, etc., includes at least two processors, and has the function of concurrently performing the elliptic curve addition ECADD and the elliptic curve doubling ECDBL described later.

Described below is an arithmetic method for an elliptic curve cryptosystem according to the present invention applied to an Weierstrass form elliptic curve over the finite field GF(p^m) with p^m elements (^ indicates a power).

An Weierstrass form elliptic curve E can be represented by the following equation:

$$E: y^2 = x^3 + a \times x + b$$

FIG. 4 shows the algorithm 2 for an arithmetic operation of the scalar multiplication d×P on an elliptic curve cryptosystem according to the first embodiment of the present invention.

The point P on the elliptic curve E and the n-bit natural number d are obtained (or input). The binary expression of the natural number d is assumed to be represented as follows:

$$d = d[n-1] \times 2^{(n-1)} + d(n-2) \times 2^{(n-2)} + \ldots + d[1] \times 2 + d[0]$$

(d[n−1]≠0, d[i]=0, 1)

In the first step S1, P is set as the initial value of the variable Q[0], and 0 is set as the initial value of the variable Q[1].

In the next step S2, i is changed by 1 from 0 to n−1 each time the loop is repeated.

In the next step S3, the elliptic curve addition ECADD of Q[0] and Q[1] is performed, and the arithmetic result is stored in Q[2].

In the next step S4, the elliptic curve doubling ECDBL is performed on Q[0], and the arithmetic result is stored in Q[0].

In the next step S5, Q[1+d[i]] depending on the value of d[i], that is, Q[1] or Q[2], is stored in Q[1].

The processes in the above mentioned steps S2 through S5 are repeated from i=0 to n−1, and Q[1] of the final arithmetic result is obtained as d×P.

The above mentioned algorithm 2 can independently compute the elliptic curve addition ECADD and the elliptic curve doubling ECDBL.

Therefore, the computation time of the scalar multiplication can be shortened by concurrently computing the elliptic curve addition ECADD and the elliptic curve doubling ECDBL of the above mentioned algorithm 2 using two processors.

FIG. 5 shows the algorithm 3 for computing the scalar multiplication d×P of the elliptic curve cryptosystem according to the second embodiment of the present invention.

The point P on the elliptic curve E and an n-bit natural number d are input.

In the first step S1, P is set as the initial value of the Q[0], and 2×P is set as the initial value of the Q[1].

In the next step S2, i is changed by 1 from n−2 to 0 each time the loop is repeated.

In the next step S3, the elliptic curve doubling ECDBL of Q[d[i]] is performed, and the arithmetic result is stored in Q[2].

In the next step S4, the elliptic curve doubling ECADD of Q[0] and Q[1] is performed, and the arithmetic result is stored in Q[1].

In the next step S5, Q[2−d[i]] is stored in Q[0].

In the next step S6, Q[1+d[i]] is stored in Q[1].

When d[i]=0, Q[2−d[i]] equals Q[2] in the process in step S5. Therefore, the arithmetic result of the elliptic curve doubling ECDBL, that is, Q[2], is stored in Q[0]. In this case, Q[1+d[i]] in the process in step S6 equals Q[1]. Therefore, the arithmetic result of the elliptic curve addition ECADD, that is, Q[1], is stored in Q[1].

On the other hand, when d[i]=1, Q[2−d[i]] equals Q[1] in step S5. Therefore, the arithmetic result of the elliptic curve addition ECADD, that is, Q[1], is stored in Q[0]. In this case, Q[1+d[i]] in the process in step S6 equals Q[2]. Therefore, the arithmetic result of the elliptic curve doubling ECDBL, that is, Q[2], is stored in Q[1].

According to the above mentioned algorithm 3, the elliptic curve addition ECADD and the elliptic curve doubling ECDBL can be independently performed. Therefore, the elliptic curve addition ECADD and the elliptic curve doubling ECDBL can be concurrently performed using two processors to shorten the computation time required for the scalar multiplication.

Furthermore, the above mentioned algorithms 2 and 3 can improve the resistance to the side channel attacks of encryption and decryption as compared with the algorithm 1 because they can perform the elliptic curve addition ECADD and the elliptic curve doubling ECDBL independent of d[i].

Figure 6:
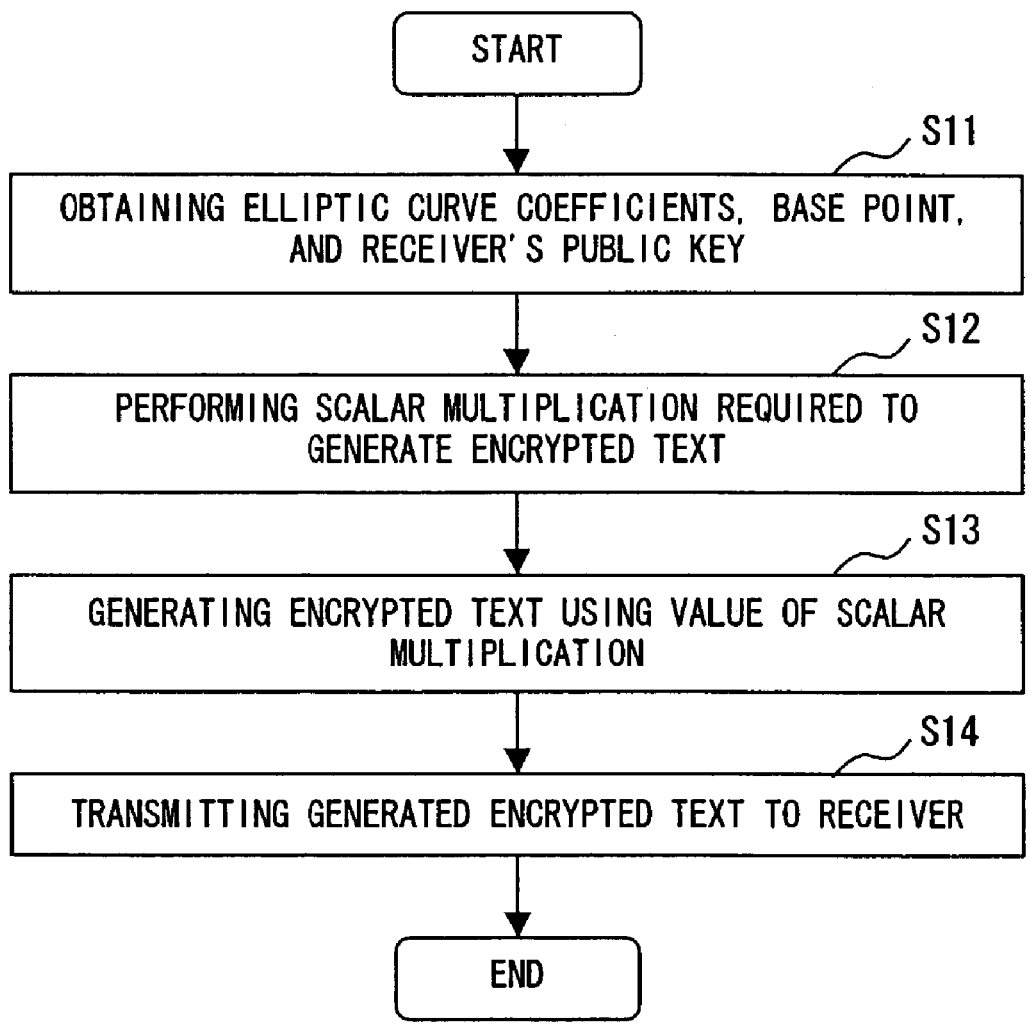
FIG. 6 is a flowchart of the elliptic curve cryptosystem program.

FIG. 6 is a flowchart of the elliptic curve cryptosystem program of the elliptic curve cryptosystem apparatus.

First, coefficients of the elliptic curve E, the base point P, and a receiver's public key are obtained (S11 shown in FIG. 6).

Then, the scalar multiplication is performed using the above mentioned algorithm 2 or 3 (S12).

Next, encrypted text is generated using the arithmetic result of the scalar multiplication (S13). Finally, the generated encrypted text is transmitted to the receiver (S14).

In an elliptic curve cryptosystem, the scalar multiplication is performed on the private key s and the point P on the elliptic curve to generate a public key.

An example of a practical process of the scalar multiplication (step S12 shown in FIG. 6) to be performed using the algorithm 3 is described below by referring to FIG. 7.

Figure 7:
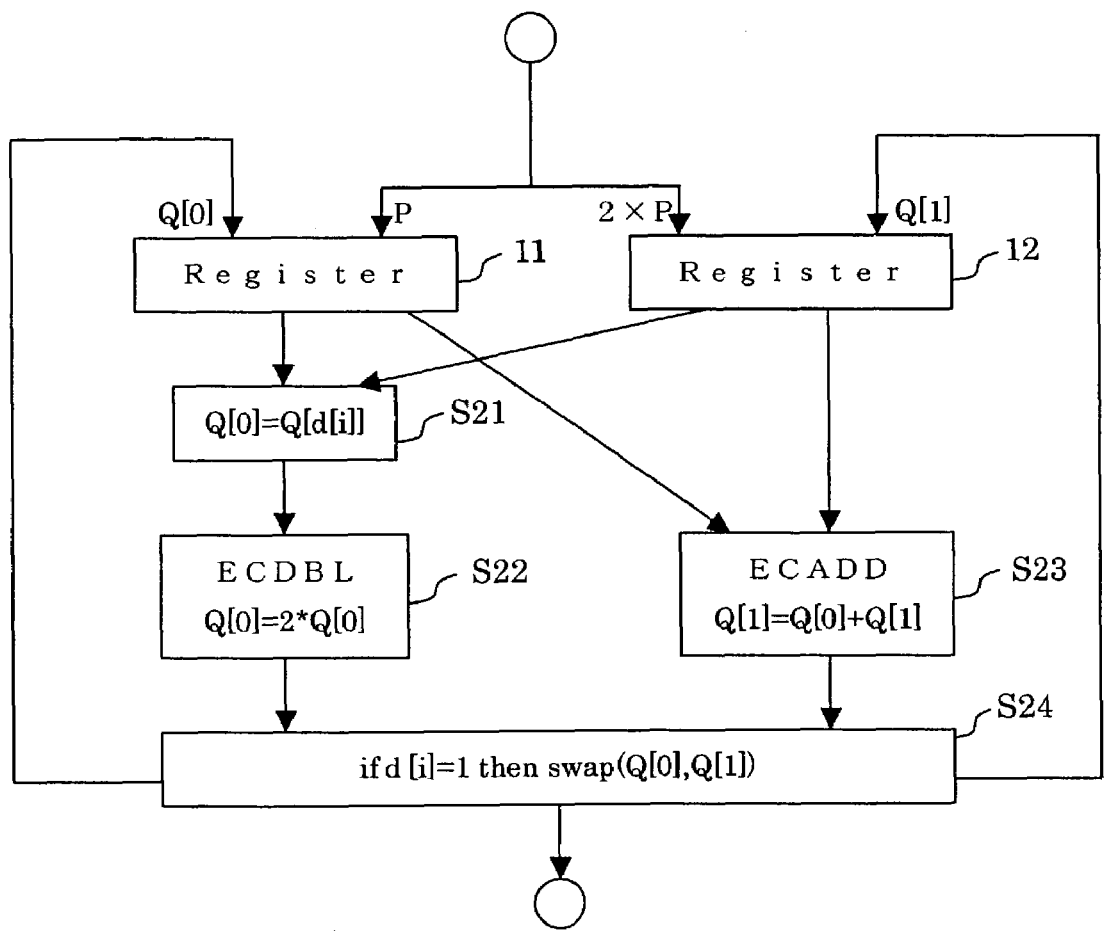
FIG. 7 shows a practical process of the algorithm 3.

FIG. 7 shows the contents of the processes when the elliptic curve addition ECADD and the elliptic curve doubling ECDBL of the elliptic curve cryptosystem program are concurrently performed based on the algorithm 3 using two processors.

The elliptic curve cryptosystem apparatus comprises two registers 11 and 12. The register 11 stores a variable Q[0], and the register 12 stores a variable Q[1].

The initial value P of Q[0] and the initial value 2×P of Q[1] are respectively set in the registers 11 and 12.

The first processor sets Q[d[i]] in Q[0] (S21 shown in FIG. 7), performs the elliptic curve doubling ECDBL on Q[0], and sets the arithmetic result in Q[0] (S22).

Then, another processor reads Q[0] stored in the register 11 and Q[1] stored in the register 12, performs the elliptic curve addition ECADD on the points, and sets the arithmetic results in Q[1] (S23).

When d[i]=0, Q[0] is stored in the register 11, and Q[1] is stored in the register 12. When d[i]=1, the values of Q[0] and Q[1] are exchanged, and Q[0] is stored in the register 11 and Q[1] is stored in the register 12 (S24).

The above mentioned process is repeated from i=n−2 to 0.

When the algorithm 3 is used, the concurrent computation of the ECADD and the ECDBL can be performed in the scalar multiplication. When the concurrent computation is performed, the total computation time is 1×ECDBL+(n−1)×ECADD because the computation time of the ECADD is normally longer than the computation time of the ECDBL, thereby considerably shortening the total computation time.

Described below is the third embodiment of the present invention. According to the third embodiment, the x coordinate of P3=P1+P2 is obtained by an elliptic curve addition having a multiplication element (x3 is obtained multiplied by x3') without using y coordinates.

Assume that the Weierstrass form elliptic curve E defined in the GF(p^m) (finite field with p elements where p indicates the number of prime numbers equal to or larger than 5) is represented by:

$$E: y^2 = x^3 + a \times x + b$$

where a and b indicate the elements of the GF(p^m), and $4 \times a^3 + 27 \times b^2 \neq 0$.

The x coordinate x1 of the point P1 of the elliptic curve E, the x coordinate x2 of the point P2, and the x coordinate x3' of P3'=P1−P2 are obtained. The x coordinate of P3=P1+P2 is assumed to be x3.

(a) When P3'=∞, x3 is obtained as the x coordinate of the elliptic curve doubling 2×P1, and is output.

(b) When P3'≠∞, and x1=x2, the point at infinity ∞ is output.

(c) When P3'≠∞, and x1≠x2, $$x3 = [(x1 \times x2 - a)^2 - 4 \times b \times (x1 + x2)] / [x3' \times (x1 - x2)^2]$$

The value of x3 is obtained by the equation above, and is output.

In the third embodiment of the present invention, the x coordinate of the elliptic curve addition ECADD can be obtained without using y coordinates, thereby simplifying the arithmetic program of the elliptic curve addition ECADD, and shortening the computation time.

Described below is the fourth embodiment of the present invention. According to the fourth embodiment, the x coordinate of P3=P1+P2 is obtained by an elliptic curve addition having an element of addition (x3 is obtained added to x3') without using y coordinates.

The x coordinate x1 of the point P1 on the Weierstrass form elliptic curve E, the x coordinate x2 of the point P2, and the x coordinate x3' of P3'=P1−P2 are obtained.

(a) When P3'=∞, x3 is obtained as the x coordinate of the elliptic curve doubling 2×P1, and is output.

(b) When P3'≠∞, and x1=x2, the point at infinity ∞ is output.

(c) When P3'≠∞, and x1≠x2, $$x3 = [2 \times (x1 + x2) \times (x1 \times x2 + a) + 4 \times b] / [(x1 - x2)^2] - x3'$$

The value of x3 is obtained by the equation above, and is output.

According to the fourth embodiment, the computation of the x coordinate of the elliptic curve addition P3=P1+P2 can be performed without using a y coordinate, thereby simplifying the arithmetic program of the elliptic curve addition ECADD, and shortening the computation time.

Described below is the fifth embodiment of the present invention. In the fifth embodiment, the x coordinate of the elliptic curve doubling P4=2×P1 is obtained without using y coordinates.

The x coordinate of the point P1 on the Weierstrass form elliptic curve E is obtained.

The GF(p^m) is defined as a finite field with p elements where p indicates a prime number equal to or larger than 5.

Assume that the Weierstrass form elliptic curve E defined in the GF(p^m) is represented by the following equation:

$$E: y^2 = x^3 + a \times x + b$$

where a and b indicate the elements of the GF(p^m), and $4 \times a^3 + 27 \times b^2 \neq 0$.

(a) When P1=∞, a point at infinity ∞ is output.

(b) When P1≠∞, x4 is computed by the following equation:

$$x4 = [(x1^2 - a)^2 - 8 \times b \times x1] / [4 \times (x1^3 + a \times x1 + b)]$$

According to the fifth embodiment, the elliptic curve doubling can be performed without using y coordinates, thereby simplifying the elliptic curve doubling, and shortening the computation time.

Described below is the sixth embodiment of the present invention. According to the sixth embodiment, a multiplicative elliptic curve addition is performed to obtain an X coordinate and a Z coordinate of P3=P1+P2 without using Y coordinates in the projective coordinate system.

The X coordinates of the points P1, P2, and P3'=P1−P2 on the Weierstrass form elliptic curve E over the finite field GF(p^m) are input.

The finite field GF(p^m) and the Weierstrass form based on which the processes are performed are the same as in the above mentioned embodiments.

The X coordinate X1 and the Z coordinate Z1 in the projective coordinate system of the point P1 on the elliptic curve E, the X coordinate X2 and the Z coordinate Z2 of the point P2, the X coordinate X3' and the Z coordinate Z3' of the point P3', and the X coordinate X3 and the Z coordinate Z3 of P3=P1+P2 are obtained.

(a) When Z3'=0, the arithmetic results of X4 and Z4 from the elliptic curve doubling 2×P1 are output as X3 and Z3.

(b) When Z3'≠0 and X1×Z2=X2×Z1, X3=0 and Z3=0 are output.

(c) When Z3'≠0 and X1×Z2≠X2×Z1, the following equations hold.

$$X3 = Z3' \times [(X1 \times X2 - a \times Z1 \times Z2)^2 - 4 \times b \times Z1 \times Z2 \times (X1 \times Z2 + X2 \times Z1)] \tag{1A}$$

$$Z3 = X3' \times [(X1 \times Z2 - X2 \times Z1)^2] \tag{2A}$$

By the equations (1A) and (2A) above, the X coordinate X3 and the Z coordinate Z3 in the projective coordinate of P3 are computed.

According to the above mentioned sixth embodiment, the elliptic curve addition can be performed without using Y coordinates of the projective coordinate system, thereby simplifying the arithmetic program and shortening the computation time.

FIG. 8 shows an example of a practical arithmetic program according to the sixth embodiment.

The arithmetic program shown in FIG. 8 realizes the arithmetics by the equations (1A) and (2A) according to the sixth embodiment, and includes the following processes.

(1) The multiplication of the X coordinate X1 of the point P1 and the X coordinate X2 of the point P2 is performed, and the result is set in T1 comprising memory or a register (the same in the following items).

(2) The multiplication of the Z coordinate Z1 of the point P1 and the Z coordinate Z2 of the point P2 is performed, and the result is set in T2.

(3) The multiplication of X1 and Z2 is performed, and the result is set in T3.

(4) The multiplication of X2 and Z1 is performed, and the result is set in T4.

(5) T2 is multiplied by a, and the result is set in T5.

(6) T5 is subtracted from T1, and the result is set in T6. This process corresponds to the arithmetic of "X1×X2−a×Z1×Z2".

(7) T6 is squared, and the result is set in T7. This process corresponds to the arithmetic of "(X1×X2−a×Z1×Z2)^2" in the equation (1A) above.

(8) T2 is multiplied by b, and the result is set in T8.

(9) T8 is multiplied by 4, and the result is set in T9.

(10) T3 is added to T4, and the result is set in T10.

(11) The multiplication of T9 and T10 is performed, and the result is set in T11.

(12) T11 is subtracted from T7, and the result is set in T12.

(13) The multiplication of Z3' and T12 is performed, and the result is set as X3. Thus, the coordinate of X3 in the equation (1A) above is obtained.

(14) T4 is subtracted from T3, and the result is set in T13.

(15) T13 is squared, and the result is set in T14.

(16) The multiplication of X3' and T14 is performed, and the result is set as Z3. Thus, the coordinate of Z3 in the equation (2A) above is obtained.

In the above mentioned arithmetic program, the X coordinate and the Z coordinate of the point P3 of the elliptic curve addition P3=P1+P2 in the projective coordinate system can be computed by nine multiplying operations, two squaring operations, and several adding, subtracting, and constant multiplying operations.

FIG. 9 shows a practical arithmetic program by the equations (1A) and (2A) according to the sixth embodiment when Z3'=1.

In this case, since Z3'=1, it is not necessary to perform the multiplication of "Z3'×T12" of the arithmetic program (13) shown in FIG. 8.

Therefore, in the arithmetic program shown in FIG. 9, the X coordinate X3 and the Z coordinate Z3 of the point P3 of the elliptic curve addition in the projective coordinate system can be computed by eight multiplying operations, two squaring operations, and several adding, subtracting, and constant multiplying operations.

Described below is the seventh embodiment of the present invention. According to the seventh embodiment, the X coordinate X3 and the Z coordinate Z3 of the elliptic curve addition P3=P1+P2 can be obtained without using Y coordinates.

According to the seventh embodiment, (a) When Z3'=0, the arithmetic results of X4 and Z4 from the elliptic curve doubling 2×P1 are output as X3 and Z3.

(b) When Z3'≠0 and X1×Z2=X2×Z1, X3=0 and Z3=0 are output.

(c) When Z3'≠0 and X1×Z2≠X2×Z1, the following equations hold:

$$X3 = Z3' \times [2 \times (X1 \times Z2 + X2 \times Z1) \times (X1 \times X2 + a \times Z1 \times Z2) + 4 \times b \times Z1^2 \times Z2^2] - X3' \times [(X1 \times Z2 - X2 \times Z1)^2] \quad (1A)$$

$$Z3 = Z3' \times [(X1 \times Z2 - X2 \times Z1)^2] \quad (2A)$$

By the equations (1A) and (2A), the X coordinate X3 and the Z coordinate Z3 of the elliptic curve addition P3=P1+P2 can be obtained.

According to the seventh embodiment, the X coordinate X3 and the Z coordinate Z3 of the elliptic curve addition P3=P1+P2 can be computed without using Y coordinates in the projective coordinate system, thereby shortening the computation time.

FIG. 10 shows the arithmetic program by the equations (1A) and (2A) according to the seventh embodiment, and comprises the following processes.

(1) The multiplication of the X coordinate X1 of the point P1 and the X coordinate X2 of the point P2 is performed, and the result is set in T1 comprising memory or a register.

(2) The multiplication of the Z coordinate Z1 of the point P1 and the Z coordinate Z2 of the point P2 is performed, and the result is set in T2.

(3) The multiplication of X1 and Z2 is performed, and the result is set in T3.

(4) The multiplication of X2 and Z1 is performed, and the result is set in T4.

(5) T3 is added to T4, and the result is set in T5.

(6) T2 is multiplied by a, and the result is set in T6.

(7) T1 is added to T6, and the result is set in T7.

(8) The multiplication of T5 and T7 is performed, and the result is set in T8. This process corresponds to the arithmetic of "(X1×Z2+X2×Z1)×(X1×X2+a×Z1×Z2)".

(9) T8 is multiplied by 2, and the result is set in T9.

(10) T2 is squared, and the result is set in T10.

(11) T10 is multiplied by b, and the result is set in T11.

(12) T11 is multiplied by 4, and the result is set in T12.

(13) T9 is added to T12, and the result is set in T13.

(14) T4 is subtracted from T3, and the result is set in T14.

(15) T14 is squared, and the result is set in T15.

(16) The multiplication of Z3' and T13 is performed, and the result is set in T16.

(17) The multiplication of X3' and T15 is performed, and the result is set in T17.

(18) T17 is subtracted from T16, and the result is obtained as the X coordinate X3 in the projective coordinate system.

(19) The multiplication of Z3' and T15 is performed, and the result is obtained as the Z coordinate Z3 in the projective coordinate system.

In the above mentioned arithmetic program, the X coordinate X3 and the Z coordinate Z3 of the point P3 of the elliptic curve addition P3=P1+P2 in the projective coordinate system can be computed by ten multiplying operations, two squaring operations, and several adding, subtracting, and constant multiplying operations.

FIG. 11 shows a practical arithmetic program by the equations (1A) and (2A) according to the seventh embodiment when Z3'=1.

In this case, since Z3'=1, it is not necessary to perform the processes of "Z3'×T13" (16) and "Z3'×T15" (19) of the arithmetic program shown in FIG. 10. Therefore, in the arithmetic program shown in FIG. 11, the X coordinate X3 and the Z coordinate Z3 of the point P3 of the elliptic curve addition in the projective coordinate system can be computed by eight multiplying operations, two squaring operations, and several adding, subtracting, and constant multiplying operations.

Described below is the eighth embodiment of the present invention. According to the eighth embodiment, the X coordinate X4 and the Z coordinate Z4 of the elliptic curve doubling P4=2×P1 can be obtained without using Y coordinates.

The X coordinate X1 and the Z coordinate Z1 of the point P1 on the Weierstrass form elliptic curve E in the GF(p^m) are input. The Weierstrass form elliptic curve E is represented by the following equation:

$$E: Y^2 \times Z = X^3 + a \times X \times Z^2 + b \times Z^3$$

The X coordinate X1 and the Z coordinate Z1 of the point P1 on the elliptic curve E and the X coordinate X4 and the Z coordinate Z4 of P4=2×P1 are obtained.

(a) When Z1=0, X4=0 and Z4=0 are output.

(b) When Z1≠0, the following equations hold.

$$X4 = (X1^2 - a \times Z1^2)^2 - 8 \times b \times X1 \times Z1^3 \quad (1A)$$

$$Z4 = 4 \times (X1 \times Z1 \times (X1^2 + a \times Z1^2) + b \times Z1^4) \quad (1B)$$

By the equations (1A) and (2A) above, the X coordinate X4 and the Z coordinate Z4 of the point P4 in the elliptic curve doubling in the projective coordinate system can be obtained.

According to the eighth embodiment, the X coordinate X4 and the Z coordinate Z4 of the elliptic curve doubling P4=2×P1 can be computed without using Y coordinates in the projective coordinate system, thereby shortening the computation time.

FIG. 12 shows an example of a practical arithmetic program by the equations (1A) and (2A) according to the eighth embodiment, and includes the following processes.

(1) The X coordinate X1 of the point P1 in the projective coordinate system is squared, and the result is set in T1.

(2) Similarly, the Z coordinate Z1 of the point P1 in the projective coordinate system is squared, and the result is set in T2.

(3) T2 is multiplied by a, and the result is set in T3.

(4) T3 is subtracted from T1, and the result is set in T4.

(5) T4 is squared, and the result is set in T5.

(6) T2 is multiplied by b, and the result is set in T6.

(7) The multiplication of the X coordinate X1 of the point P1 and the Z coordinate Z1 is performed, and the result is set in T7.

(8) The multiplication of T6 and T7 is performed, and the result is set in T8.

(9) T8 is multiplied by 8, and the result is set in T9.

(10) T9 is subtracted from T5, and the result is obtained as the X coordinate X4 of the point P4.

(11) T1 is added to T3, and the result is set in T10.

(12) The multiplication of T7 and T10 is performed, and the result is set in T11.

(13) The multiplication of T6 and T2 is performed, and the result is set in T12.

(14) T11 is added to T12, and the result is set in T13.

(15) T13 is multiplied by 4, and the result is obtained as the Z coordinate Z4 of the point P4.

In the arithmetic program, the X coordinate X4 and the Z coordinate Z4 of the elliptic curve doubling P4=2×P1 can be computed by six multiplying operations, three squaring operations, and several adding, subtracting, and constant multiplying operations, thereby shortening the total computation time.

Described below is the ninth embodiment of the present invention. According to the ninth embodiment, the x coordinate and the y coordinate of the point P of the elliptic curve E, and the x coordinates of the points P[d] and P[d+1] are obtained, and the y coordinate of the point P[d] is computed.

The x coordinate and the y coordinate of the point P of the Weierstrass form elliptic curve E in the GF($p^m$), and the x coordinates $x[d]$ and $x[d+1]$ of the points P[d] and P[d+1] are obtained. The Weierstrass form elliptic curve E is represented by the following equation:

$$E: y^2 = x^3 + a \times x + b,$$

where a and b are elements of the GF($p^m$), $4 \times a^3 + 27 \times b^2 \neq 0$ Assume for the point P=(x, y) of the elliptic curve E, the x coordinate of P[d]=d×P is $x[d]$, and the x coordinate of P[d+1]=(d+1)×P is $x[d+1]$.

$$y[d] = [y^2 + x[d]^3 + a \times x[d] + b - (x - x[d])^2 \times (x + x[d] + x[d+1])]/2xy$$

The y coordinate $y[d]$ of the point P[d] can be obtained by the equation above.

According to the ninth embodiment, the points P[d] and P[d+1] are computed without using y coordinates in the above mentioned computing method, and the y coordinate $y[d]$ of the point P[d] can be obtained using the x coordinates, thereby shortening the computation time.

Described below is the tenth embodiment of the present invention. According to the tenth embodiment, after obtaining the X coordinate and the Z coordinate of the P[d] and P[d+1] in the projective coordinate system, the Y coordinate of the P[d] in the projective coordinate is obtained.

The x coordinate and the y coordinate of the point P on the Weierstrass form elliptic curve E in the GF ($p^m$), and the X coordinate and the Z coordinate of the points P[d] and P[d+1] in the projective coordinate system are obtained.

Assume that the Weierstrass form elliptic curve defined in the GF($p^m$) is represented as follows:

$$E: Y^2 \times Z = X^3 + a \times X \times Z^2 + b \times Z^3$$

where a and b are the elements of the GF($p^m$), and $4 \times a^3 + 27 \times b^2 \neq 0$.

Assume the point P=(x, y) on the elliptic curve E, the X coordinate of P[d]=d×P in the projective coordinate system is X[d], and the Z coordinate is Z[d], the X coordinate of P[d+1]=(d+1)×P in the projective coordinate system is X[d+1], and the Z coordinate is Z[d+1]. The projective coordinates are X'[d]=r×X[d], Y'[d]=r×Y[d], and Z'[d]=r×Z[d]. The value of the denominator of Y[d] is set as r.

The projective coordinate of P[d] can be represented by the following equation:

$$X'[d] = 2 \times y \times Z[d]^2 \times Z[d+1] \times X[d] \tag{1A}$$

$$\begin{aligned}Y'[d] = Z[d+1] \times (y^2 \times Z[d]^3 + X[d]^3 + a \times X[d] \times Z[d]^2 + \\ b \times Z[d]^3) - (x \times Z[d] - X[d])^2 \times (x \times Z[d] \times Z[d+1] + X \\ [d] \times Z[d+1] + X[d+1] \times Z[d])\end{aligned} \tag{2A}$$

$$Z'[d] = 2 \times y \times Z[d]^2 \times Z[d+1] \times Z[d] \tag{3A}$$

By the equation (2A) above, the Y coordinate of P[d] in the projective coordinate system can be computed by an equation not containing a division. In the projective coordinate system, (X[d]:Y[d]:Z[d]) equals (X'[d]:Y'[d]:Z'[d]) obtained by multiplying each of the original elements by r. Therefore, the Y coordinate of P[d] can be obtained from the above mentioned result.

According to the tenth embodiment, the Y coordinate of the point P[d] of the scalar multiplication can be obtained in the projective coordinate system without a dividing operation, thereby shortening the computation time.

FIG. 13 shows an example of a practical arithmetic program according to the tenth embodiment of the present invention. The arithmetic program comprises the following processes.

(1) The Z coordinate Z[d] of the point P[d] is squared, and the result is set in T1.

(2) The multiplication of T1 and Z[d+1] is performed, and the result is set in T2. This process corresponds to the arithmetic of "Z[d]^2×Z[d+1]".

(3) The multiplication of the Y coordinate y of the point P and T2 is performed, and the result is set in T3. This process corresponds to the arithmetic of "y×Z[d]^2×Z[d+1]".

(4) The multiplication of the X coordinate X[d] of P[d] in the projective coordinate system and T3 is performed, and the result is set in T4. This process corresponds to the arithmetic of "y×Z[d]^2×Z[d+1]×X[d]".

(5) T4 is multiplied by 2, and the result is set in X'[d].

(6) The multiplication of the Z coordinate Z[d] of P[d] in the projective coordinate system and T3 is performed, and the result is set in T5. This process corresponds to the arithmetic of "y×Z[d]^2×Z[d+1]×Z[d]".

(7) T5 is multiplied by 2, and the result is set in Z'[d].

(8) X[d] is squared, and the result is set in T6.

(9) T1 is multiplied by a, and the result is set in T7.

(10) T6 is added to T7, and the result is set in T8.

(11) The multiplication of X[d] and the Z coordinate Z[d+1] of the point P[d+1] is performed, and the result is set in T9.

(12) The multiplication of T9 and T8 is performed, and the result is set in T10. This process corresponds to the arithmetic of "X[d]×Z[d+1]×(X[d]^2+a×Z[d]^2)".

(13) The multiplication of y and T5 is performed, and the result is set in T11. This process corresponds to the arithmetic of "y^2×Z[d]^3×Z[d+1]".

(14) Z[d] is multiplied by b, and the result is set in T12.

(15) The multiplication of T12 and T2 is performed, and the result is set in T13. This process corresponds to the arithmetic of "b×Z[d]^3×Z[d+1]".

(16) The multiplication of x and Z[d] is performed, and the result is set in T14.

(17) X[d] is subtracted from T14, and the result is set in T15. This process corresponds to the arithmetic of "x×Z[d]−X[d]".

(18) T15 is squared, and the result is set in T16. This process corresponds to the arithmetic of "(x×Z[d]−X[d])^2".

(19) The multiplication of T14 and Z[d+1] is performed, and the result is set in T17. This process corresponds to the arithmetic of "x×Z[d]×Z[d+1]".

(20) The multiplication of X[d+1] and Z[d] is performed, and the result is set in T18.

(21) T17, T9, and T18 are added up, and the result is set in T19.

(22) The multiplication of T16 and T19 is performed, and the result is set in T20.

(23) T20 is subtracted from the sum of T10, T11, and T13, and the result is set in Y'[d]. Thus, the Y coordinate Y' [d] of the point P[d] in the projective coordinate system can be obtained.

The above mentioned arithmetic program can be realized by fourteen multiplying operations, three squaring operations, and several adding, subtracting, and constant multiplying operations.

Described below is the eleventh embodiment of the present invention. The eleventh embodiment performs the arithmetic of P[d]=d×P by using the arithmetic method of a multiplicative elliptic curve addition without using Y coordinates according to the third embodiment, the arithmetic method of the elliptic curve doubling without using Y coordinates according to the fifth embodiment, and the arithmetic method for obtaining the coordinates (X'[d]:Y'[d]:Z'[d]) of P[d] in the projective coordinate according to the ninth embodiment.

In the eleventh embodiment, the x coordinate and the y coordinate of the point P on the elliptic curve E in the GF(p^m), and n-bits of natural number d are input, and the algorithm 3 shown in FIG. 5 is used with the initial value Q[0]=P, and Q[1]=0.

That is, the elliptic curve addition ECADD in the algorithm 3 shown in FIG. 5 is performed in the arithmetic method of the multiplicative elliptic curve addition without using y coordinates according to the third embodiment, and the elliptic curve doubling ECDBL is performed in the arithmetic method of the elliptic curve doubling without using y coordinates according to the fifth embodiment. Then, after completing the loop according to the algorithm 3, the equations x[d]=Q[0] and x[d+1]=Q[1] are set, and the y coordinate y[d] of P[d] is computed from the x coordinates x[d] and x[d+1] of the point P[d] and P[d+1] in the arithmetic program of the ninth embodiment.

Described below is the twelfth embodiment of the present invention. The twelfth embodiment performs to compute P[d]=d×P by using the arithmetic method of an additive elliptic curve addition without using y coordinates according to the fourth embodiment, the arithmetic method of the elliptic curve doubling without using y coordinates according to the fifth embodiment, and the arithmetic method for computing y coordinates according to the ninth embodiment.

According to the twelfth embodiment of the present invention, the coordinate of the point P on the elliptic curve E and n-bit natural number d are input, the elliptic curve addition ECADD in the arithmetic program of the algorithm 3 shown in FIG. 5 is performed in the arithmetic method of the additive elliptic curve addition without using y coordinates according to the fourth embodiment, and the elliptic curve doubling ECDBL is performed in the arithmetic method of the elliptic curve doubling without using y coordinates according to the fifth embodiment. After completing the loop according to the algorithm 3, the equations x[d]=Q[0] and x[d+1]=Q[1] are set, and the y coordinate y[d] of P[d] is computed from the x coordinates x[d] and x[d+1] of the point P[d] and P[d+1] in the arithmetic program of the ninth embodiment.

Described below is the thirteenth embodiment of the present invention. The thirteenth embodiment performs to compute P[d]=P×d by using the arithmetic method of a multiplicative elliptic curve addition without using Y coordinates in the projective coordinate system according to the sixth embodiment, the arithmetic method of the elliptic curve doubling without using Y coordinates in the projective coordinate system according to the eighth embodiment, and the arithmetic method for obtaining the coordinates (X' [d]:Y'[d]:Z'[d]) of P[d] in the projective coordinate according to the tenth embodiment.

According to the thirteenth embodiment, the X coordinate and the Y coordinate of the point P on the elliptic curve E, and n-bit natural number d are input, the initial value Q[0]=(X:Z), Q[1]=(0:1) are set, and the arithmetic program of the algorithm 3 shown in FIG. 5 is used. The coordinates of the point P in the projective coordinate system are (X:Y:Z).

The elliptic curve addition ECADD of the arithmetic program of the algorithm 3 shown in FIG. 5 is performed in the arithmetic method of the multiplicative elliptic curve addition without using Y coordinates in the projective coordinate system according to the sixth embodiment, and the elliptic curve doubling ECDBL is performed in the arithmetic method of the elliptic curve doubling without using Y coordinates in the projective coordinate system according to the eighth embodiment of the present invention.

When the loop of the algorithm 3 is completed, X'[d], Y'[d], and Z'[d] are computed in the arithmetic method according to the tenth embodiment with X[d] set as the first element (X element) of Q[0], Z[d] set as the second element (Z element) of Q[0], X[d+1] set as the first element (X element) of Q[1], and Z[d+1] set as the second element (Z element) of Q[1]. Furthermore, the X coordinate and the Y coordinate of the point P[d] are computed with x[d]=X'[d]/Z'[d] and y[d]=Y'[d]/Z'[d].

In the above mentioned thirteenth embodiment, the elliptic curve addition ECADD of the algorithm 3 can be performed by the arithmetic program of the elliptic curve addition according to the sixth embodiment shown in FIG. 8, and the elliptic curve doubling ECDBL can be performed by the arithmetic program of the elliptic curve doubling according to the eighth embodiment shown in FIG. 12. After the loop of the algorithm 3 is completed, the computation of the coordinates (X'[d]:Y'[d]:Z'[d]) of the point P[d] in the projective coordinate system can be performed by the arithmetic program for computing the projective coordinate in the tenth embodiment shown in FIG. 13.

In this case, the computation in each loop of the algorithm 3 can be realized by fifteen multiplying operations, five squaring operations, and several adding, subtracting, and constant multiplying operations.

When Z=1, the elliptic curve addition ECADD of the algorithm 3 can be performed by the arithmetic program shown in FIG. 11 instead of executing the arithmetic program shown in FIG. 8. Other arithmetic operations are the same as those described above.

In this case, the computation in each loop of the algorithm 3 can be realized by fourteen multiplying operations, five squaring operations, and several adding, subtracting, and constant multiplying operations.

Described below is the fourteenth embodiment of the present invention. The fourteenth embodiment performs to compute P[d]=P×d by using the arithmetic method of a additive elliptic curve addition without using Y coordinates in the projective coordinate system according to the seventh embodiment, the arithmetic method of the elliptic curve doubling without using Y coordinates in the projective coordinate system according to the eighth embodiment, and the arithmetic method for obtaining the coordinates (X'[d]:Y'[d]:Z'[d]) of P[d] in the projective coordinate according to the tenth embodiment.

According to the fourteenth embodiment, the X coordinate and the Y coordinate of the point P on the elliptic curve E, and n-bit natural number d are input, the initial value Q[0]=(X:Z), Q[1]=(0:1) are set, and the arithmetic program of the algorithm 3 shown in FIG. 5 is used. The coordinates of the point P in the projective coordinate system are (X:Y:Z).

The elliptic curve addition ECADD of the arithmetic program of the algorithm 3 shown in FIG. 5 is performed in the arithmetic method of the additive elliptic curve addition without using Y coordinates in the projective coordinate system according to the seventh embodiment, and the elliptic curve doubling ECDBL is performed in the arithmetic method of the elliptic curve doubling without using Y coordinates in the projective coordinate system according to the eighth embodiment of the present invention. The subsequent arithmetic process is the same as that performed after the completion of the loop of the algorithm 3 according to the above mentioned thirteenth embodiment.

In these processes, P[d]=(X'[d]:Y'[d]:Z'[d]) can be computed.

In the above mentioned fourteenth embodiment, the elliptic curve addition ECADD of the algorithm 3 is performed by the arithmetic program of the elliptic curve addition without using Y coordinates in the projective coordinate system shown in FIG. 10 (seventh embodiment), and the elliptic curve doubling ECDBL can be performed by the arithmetic program of the elliptic curve doubling without using Y coordinates in the projective coordinate system shown in FIG. 12 (eighth embodiment). After the completion of the loop of the algorithm 3, the computation of the coordinate (X'[d]:Y'[d]:Z'[d]) of the point P[d] in the projective coordinate system can be performed by the arithmetic program for computing P[d] =(X'[d]:Y'[d]:Z'[d]) shown in FIG. 13.

In this case, the computation in each loop of the algorithm 3 can be realized by sixteen multiplying operations, five squaring operations, and several adding, subtracting, and constant multiplying operations.

When Z=1, the arithmetic program shown in FIG. 10 can be replaced with the arithmetic program shown in FIG. 11.

In this case, the computation in each loop of the algorithm 3 can be realized by fourteen multiplying operations, five squaring operations, and several adding, subtracting, and constant multiplication.

FIG. 14 shows an example of an arithmetic program ECADDDBL obtained by summarizing the common elements of the elliptic curve addition ECADD and elliptic curve doubling ECDBL according to the fourth embodiment. The arithmetic program comprises the following processes.

(1) The multiplication of the X coordinate X1 of the point P1 in the projective coordinate system and the X coordinate X2 of the point P2 in the projective coordinate system is performed, and the result is set in T1 comprising memory or a register (the same in the following items).

(2) The multiplication of the Z coordinate Z1 of the point P1 and the Z coordinate Z2 of the point P2 is performed, and the result is set in T2.

(3) The multiplication of X1 and Z2 is performed, and the result is set in T3.

(4) The multiplication of X2 and Z1 is performed, and the result is set in T4.

(5) T3 is added to T4, and the result is set in T5.

(6) T2 is multiplied by a, and the result is set in T6.

(7) T1 is added to T6, and the result is set in T7.

(8) The multiplication of T5 and T7 is performed, and the result is set in T8. This process corresponds to the arithmetic of "(X1×Z2+X2×Z1)(X1×X2+a×Z1×Z2)".

(9) T8 is multiplied by 2, and the result is set in T9.

(10) T2 is squared, and the result is set in T10. This process corresponds to the arithmetic of "Z1^2×Z2^2".

(11) T10 is multiplied by b, and the result is set in T11.

(12) T11 is multiplied by 4, and the result is set in T12.

(13) T9 is added to T12, and the result is set in T13. This process corresponds to the arithmetic of 2×(X1×Z2+X2×Z1)(X1×X2+a×Z1×Z2)+4×b×Z1^2×Z2^2).

(14) T4 is subtracted from T3, and the result is set in T14. This process corresponds to X1×Z2−X2×Z1.

(15) T14 is squared, and the result is set in T15. This process corresponds to the arithmetic of "(X1×Z2−X2×Z1)^2".

(16) The multiplication of Z3' and T13 is performed, and the result is set in T16.

(17) The multiplication of X3' and T15 is performed, and the result is set in T17.

(18) T17 is subtracted from T16, and the result is set in X3.

(19) The multiplication of Z3' and T15 is performed, and the result is set in Z3.

(20) T3 is squared, and the result is set in T21. This process corresponds to the arithmetic of "X1^2×Z2^2".

(21) The multiplication of T6 and T2 is performed. The process corresponds to the arithmetic of "a×Z1^2×Z2^2".

(22) T22 is subtracted from T21, and the result is set in T23. This process corresponds to "X1^2×Z2^2−a×Z1^2×Z2^2".

(23) T23 is squared, and the result is set in T24. This process corresponds to the arithmetic of "(X1^2×Z2^2−a×Z1^2×Z2^2)^2".

(24) T11 is set in T25.

(25) T25 is multiplied by T2, and the result is set in T26. This process corresponds to the arithmetic of "b×Z1^3×Z2^3".

(26) The multiplication of T26 and T3 is performed, and the result is set in T27. The process corresponds to "b×X1×Z1^3×Z2^4".

(27) T27 is multiplied by 8, and the result is set in T28. This process corresponds to the arithmetic of "8×b×X1×Z1^3×Z2^4".

(28) T28 is subtracted from T24, and the result is set in X4.

(29) T21 is added to T22, and the result is set in T29. This process corresponds to the arithmetic of "X1^2×Z2^2+a×Z1^2×Z2^2".

(30) The multiplication of T3 and T29 is performed, and the result is set in T30. The process corresponds to the arithmetic of "X1×Z2(X1^2×Z2^2+a×Z2×Z2^2)".

(31) T30 is added to T26, and the result is set in T31.

(32) The multiplication of T2 and T31 is performed, and the result is set in T32.

(33) T32 is multiplied by 4, and the result of Z4 is obtained.

Using the above mentioned arithmetic program, the coordinates (X'[d]:Y'[d]:Z'[d]) of the P[d] in the projective coordinate system can be computed.

In this case, the computation of each loop of the algorithm 3 can be realized by fourteen multiplying operations, five squaring operations, and several adding, subtracting, and constant multiplication in the GF (p^m).

FIG. 15 shows an example of an arithmetic program of ECADDDBL when Z3'=1.

In this case, the computation of each loop of the algorithm 3 can be realized by thirteen multiplying operations, four squaring operations, and several adding, subtracting, and constant multiplication.

Described below is the fifteenth embodiment of the present invention. In the fifteenth embodiment, the coordinates (u, v) of the point P on the Montgomery form elliptic curve E, the U coordinate and V coordinate of the point P[d] and P[d+1] in the projective coordinate system are obtained or input. Assume U[d] as the U coordinate of the point P[d]=d×P in the projective coordinate system; and W[d] as the W coordinate. U[d+1] as the U coordinate of the point P[d+1]=(d+1)×P in the projective coordinate; and W[d+1] as the W coordinate.

Assume that the Montgomery form elliptic curve E as follows.

$$B \times V^2 \times W = U^3 + A \times U^2 \times W + U \times W^2$$

where A and B indicate the elements of GF(p^m), and B(A^2−4)≠0.

$$U'[d] = 4Bv \times U[d+1] \times W[d+1] \times W[d] \times U[d] \qquad (1A)$$

$$V'[d] = (u \times U[d] - W[d])^2 \times W[d+1]^2 - (U[d] - u \times W[d])^2 \times U[d+1]^2; \text{ (}\hat{\ }\text{ indicates a power)} \qquad (2A)$$

$$W'[d] = 4Bv \times U[d+1] \times W[d+1] \times W[d]^2 \qquad (3A)$$

By the equations (1A) through (3A) above, the coordinates (U'[d]:V'[d]:W'[d]) of P[d]=d×p in the projective coordinate system are computed.

According to the fifteenth embodiment, the coordinates of the P[d] in the projective coordinate system can be computed without using a division, thereby shortening the computation time.

Figure 16:
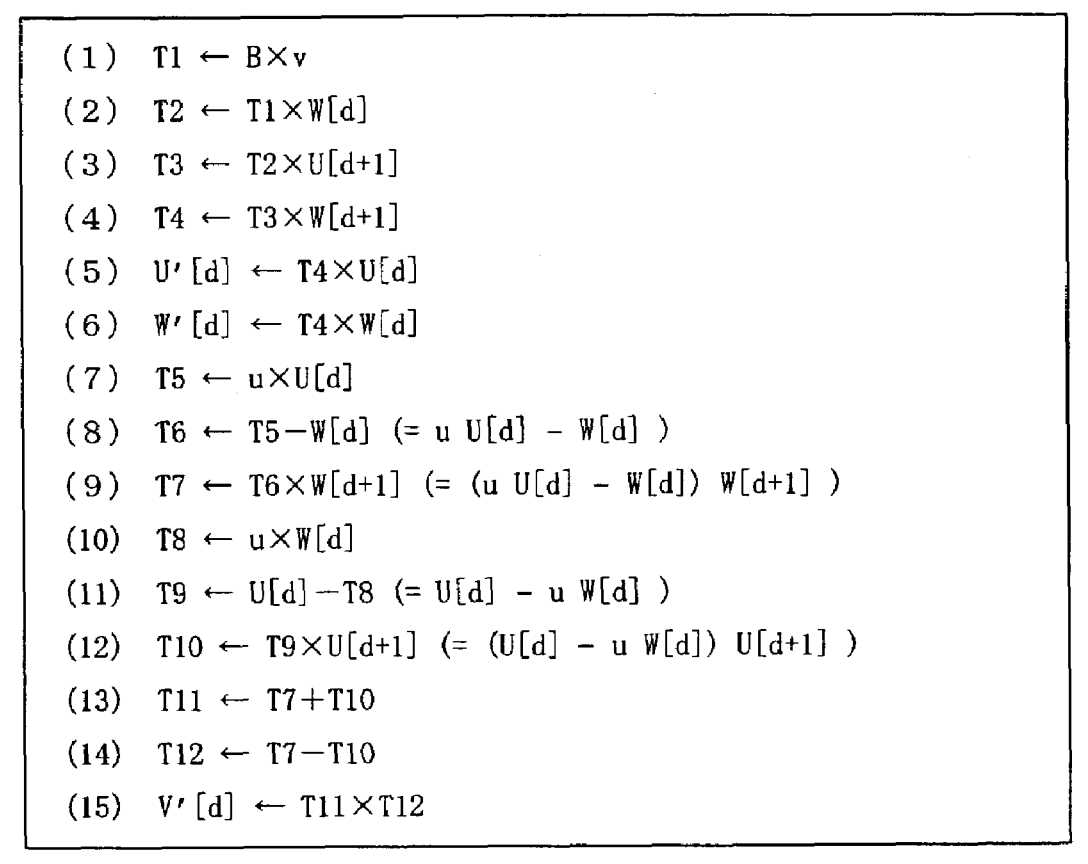

FIG. 16 shows an example of an arithmetic program by the equations (1A) through (3A) according to the above mentioned fifteenth embodiment. The arithmetic program is formed by the following processes.

(1) The multiplication of the v coordinates of the point P on the Montgomery form elliptic curve E and B is performed, and the result is set in T1.

(2) The multiplication of T1 and the W coordinate W[d] of P[d] is performed, and the result is set in T2.

(3) The multiplication of T2 and the U coordinate U[d+1] of P[d+1] is performed, and the result is set in T3.

(4) The multiplication of T3 and the W coordinate W[d+1] of P[d+1] is performed, and the result is set in T4.

(5) The multiplication of T4 and U[d] is performed, and the result is set in U'[d].

(6) The multiplication of T4 and W[d] is performed, and the result is set in W'[d].

(7) The multiplication of the coordinate u of P and U[d] is performed, and the result is set in T5.

(8) W[d] is subtracted from T5, and the result is set in T6. The process corresponds to the arithmetic of "u×U[d]−W[d]".

(9) The multiplication of T6 and W[d+1] is performed, and the result is set in T7. This process corresponds to the arithmetic of "(u×U[d]−W[d])×W[d+1]".

(10) The multiplication of u and W[d] is performed. and the result is set in T8.

(11) T8 is subtracted from U[d], and the result is set in T9. This process corresponds to the arithmetic of "U[d]−u×W[d]".

(12) The multiplication of T9 and U[d+1] is performed, and the result is set in T10. This process corresponds to the arithmetic of "(U[d]−u×W[d])×U[d+1]".

(13) T7 is added to T10, and the result is set in T11.

(14) T10 is subtracted from T7, and the result is set in T12.

(15) The multiplication of T11 and T12 is performed, and V'[d] is obtained.

Using the above mentioned arithmetic program, the coordinates (U'[d]:V'[d]:W'[d]) of P[d] in the projective coordinate system can be computed.

In this case, the computation can be realized by eleven multiplying operations and several adding, subtracting, and constant multiplication.

The computation time required by the arithmetic program in the above mentioned embodiment is compared with the computation time required by the algorithm shown in FIG. 3.

In the case of the number of bits of n=160, assume that the time required in the multiplication in the GF(p^m) is M, the time required by the squaring is S, and the time required to compute an inverse is I, 1I=30M, and 1S=0.8M.

The computation time required by the algorithm 1 (binary method) and the scalar multiplication on the Jacobian coordinates is 2226.0 M, and the computation time required by the algorithm 1 (signed binary method) and the scalar multiplication on the Jacobian coordinates is 1950.4 M.

On the other hand, according to the present embodiment, the computation time required by, for example, the algorithm 3 for computing the scalar multiplication using the arithmetic program of the elliptic curve addition without using a Y coordinate in the projective coordinate shown in FIG. 8, the arithmetic program of the elliptic curve doubling without using a Y coordinate in the projective coordinate system shown in FIG. 12, and the arithmetic program for computing the coordinates (X'[d]:Y'[d]:Z'[d]) in the projective coordinate system shown in FIG. 13 is 1742.2 M.

Additionally, the computation time required when the algorithm 3 is used for computing the scalar multiplication when Z=1, using the arithmetic program of the elliptic curve addition without using a Y coordinate in the projective coordinate system shown in FIG. 9, the arithmetic program of the elliptic curve doubling without using the Y coordinate in the projective coordinate system shown in FIG. 12, and the arithmetic program for computing the coordinates (X'[d]:Y'[d]:Z'[d]) in the projective coordinate system shown in FIG. 13 is 1583.2 M.

The computation time required by, for example, the algorithm 3 being used for the scalar multiplication using the arithmetic program of the elliptic curve addition without using a Y coordinate in the projective coordinate shown in FIG. 10, the arithmetic program of the elliptic curve doubling without using a Y coordinate in the projective coordinate system shown in FIG. 12, and the arithmetic program for computing the coordinates (X'[d]:Y'[d]:Z'[d]) in the projective coordinate system shown in FIG. 13 is 1901.2 M.

Additionally, the computation time required when the algorithm 3 is used for computing the scalar multiplication when Z=1, using the arithmetic program of the elliptic curve addition without using a Y coordinate in the projective coordinate system shown in FIG. 11, the arithmetic program of the elliptic curve doubling without using the Y coordinate in the projective coordinate system shown in FIG. 12, and the arithmetic program for computing the coordinates (X'[d]:Y'[d]:Z'[d]) in the projective coordinate system shown in FIG. 13 is 1583.2 M.

As described above, the computation time for the scalar multiplication can be considerably shortened.

FIG. 17 shows an example of the hardware environment of an information processing device 20 for executing the arithmetic program of the scalar multiplication according to the embodiments of the present invention.

A basic program such as BIOS is stored in ROM 24 connected to two CPUs 22 and 23 through a bus 21. The program is also stored in a storage device 25 such as a hard disk connected to the CPUs 22 and 23 through the bus 21, copied to RAM 26, and executed by the CPUs 22 and 23. A storage medium reading device 27 reads the program from a portable storage medium 28 such as a flexible disk, CD-ROM, DVD, etc., and allows the information processing device 20 to install it, or reads the program directly from the portable storage medium 28 for execution by the CPUs 22 and 23.

An input/output device 29 comprises a keyboard, a mouse, a template, a display, etc., transmits an instruction from a user of the information processing device 20 to the CPUs 22 and 23, and presents an arithmetic result from the CPUs 22 and 23 to the user.

A communications interface 30 connects the information processing device 20 to an information provider 32 through a network 31. The information provider 32 can store the program in the server device, etc. to download it to the information processing device 20 through the network 31.

The present invention can be applied not only to the above mentioned binary expression of a natural number d, but also to any arithmetic method of the scalar multiplication in which an elliptic curve addition and an elliptic curve doubling can be concurrently performed.

It is also applied to any elliptic curve including a Weierstrass form elliptic curve and a Montgomery form elliptic curve.

The present invention can perform scalar multiplication at a high speed, and improve the resistance to side channel attacks.

What is claimed is:

1. An elliptic curve cryptosystem apparatus, comprising:
an obtaining unit obtaining coordinate of a point P on an elliptic curve over a finite field and an n-bit natural number d;
register Q[2];
register Q[1];
register Q[0];
an arithmetic unit concurrently performing an elliptic curve addition ECADD and an elliptic curve doubling ECDBL when obtaining d×P by repeatedly performing steps (1) through (4) listed below a predetermined number of times based on the coordinates of the point P and the natural number d obtained by said obtaining unit:

$$Q[2]=ECDBL(Q[d[i]]) \quad (1)$$

$$Q[1]=ECADD(Q[0],Q[1]) \quad (2)$$

$$Q[0]=Q[2-d[i]] \quad (3)$$

$$Q[1]=Q[1+d[i]] \quad (4)$$

where an initial value of the register Q[0] is P, an initial value of the register Q[1] is 2×P, and a coefficient of a binary expression of a natural number d obtained by said obtaining unit is d[i] (d[n−1]~d[0], d[i]=0, 1), wherein said arithmetic unit performs a conditional set of operations comprising storing an arithmetic result of the elliptic curve doubling ECDBL stored in the register Q[2] into the register Q[0] in step (3) and stores an arithmetic result of the elliptic curve addition ECADD stored in the register Q[1] into the register Q[1] in step (4) when d[i]=0; and stores the arithmetic result of the elliptic curve addition ECADD stored in the register Q[1] into the register Q[0] in step (3) and stores the arithmetic result of the elliptic curve doubling ECDBL stored in the register Q[2] into the register Q[1] in step (4) when d[i]=1; and an encryption unit generating encrypted data using the result stored in the register Q[1].

2. An elliptic curve cryptosystem apparatus, comprising
an obtaining unit obtaining coordinate of a point P on an elliptic curve over an finite field and an n-bit natural number d;
register Q[2];
register Q[1];
register Q[0];
an arithmetic unit concurrently performing an elliptic curve addition ECADD and an elliptic curve doubling ECDBL when obtaining d×P by repeatedly performing steps (1) through (4) listed below a predetermined number of times based on the coordinates of the point P and the natural number d obtained by said obtaining unit:

$$Q[2]=ECDBL(Q[d[i]]) \quad (1)$$

$$Q[1]=ECADD(Q[0],Q[1]) \quad (2)$$

$$Q[0]=Q[2-d[i]] \quad (3)$$

$$Q[1]=Q[1+d[i]] \quad (4)$$

where an initial value of the register Q[0] is P, an initial value of the register Q[1] is 2×P, and a coefficient of a binary expression of a natural number d obtained by said obtaining unit is d[i] (d[n−1]~d[0], d[i]=0, 1), wherein said obtaining unit obtaining x coordinate x1 of a point P1 on an elliptic curve over a finite field, an x coordinate x2 of a point P2, P3'=P1−P2, and x coordinates of points P[d] and P[d+1]; and performing arithmetic of an elliptic curve addition ECADD by an equation (5)

$$x3=[(x1+x2-a)^2-4b(x1+x2)]/[x3'x(x1-x2)^2] \quad (5)$$

performing arithmetic of an elliptic curve doubling ECDBL by an equation (6)

$$x4=[(x1^2-a)^2-8\times b\times x1]/[4(x1^3+a\times x1+b)], \text{ where } x[d]=Q[0], x[d+1]=Q[1]; \quad (6)$$

a storage unit storing the d×P; and
an encryption unit generating encrypted data using a result stored in the storage unit.

3. An elliptic curve cryptosystem apparatus, comprising:
an obtaining unit obtaining an x coordinate x1 of a point P1 on an elliptic curve over a finite field, an x coordinate x2 of a point P2, P3'=P1−P2, and x coordinates of points P[d] and P[d+1];
register Q[2];
register Q[1];
register Q[0];

an arithmetic unit performing arithmetic to obtain d×P by repeatedly performing steps (1) through (4) a predetermined number of times based on data obtained by said obtaining unit $$Q[2]=ECDBL(Q[d[i]]) \qquad (1)$$

$$Q[1]=ECADD(Q[0],Q[1]) \qquad (2)$$

$$Q[0]=Q[2-d[i]] \qquad (3)$$

$$Q[1]=Q[1+d[i]] \qquad (4)$$

where an initial value of the register Q[0] is P, an initial value of the register Q[1] is 2×P, and a coefficient of a binary expression of a natural number d is d[i] (d[i]=0, 1), performing arithmetic of an elliptic curve addition ECADD by an equation (5)

$$x3=[2(x1+x2)\times(x1\times x2+a)+4b]/[(x1-x2)^2]-x3', \qquad (5)$$

performing arithmetic of an elliptic curve doubling ECDBL by an equation (6)

$$x4=[(x1^2-a)^2-8\times x1]/[4(x1^3+a\times x1+b)], \qquad (6)$$

and performing arithmetic of obtaining a y coordinate of P[d]=d×p by an equation (7)

$$y[d]=[y^2+x[d]^3+ax[d]+b-(x-x[d])2\times(x+x[d]+x[d+1])]/[2\times y] \text{ (\^{} indicates a power)} \qquad (7)$$

where x[d]=Q[0], x[d+1]=Q[1];

a storage unit storing the d×P; and an encryption unit generating encrypted data using a result stored in the storage unit.

4. The elliptic curve cryptosystem apparatus according to claim 3, wherein an elliptic curve addition ECADD and an elliptic curve doubling ECDBL is concurrently performed when d×P is obtained by repeatedly performing arithmetics a predetermined number of times by equations (1) through (4)

$$Q[2]=ECDBL(Q[d[i]]) \qquad (1)$$

$$Q[1]=ECADD(Q[0],Q[1]) \qquad (2)$$

$$Q[0]=Q[2-d[i]] \qquad (3)$$

$$Q[1]=Q[1+d[i]] \qquad (4)$$

where an initial value of a variable Q[0] is P, an initial value of a variable Q[1] is 2×P, and a coefficient of a binary expression of a natural number d is d[i] (d[i]=0, 1).

5. An elliptic curve cryptosystem apparatus, comprising:

an obtaining unit obtaining an x coordinate of a point P1 on an elliptic curve over a finite field, an x coordinate of a point P2, and an n-bit natural number d;

register Q[2];
register Q[1];
register Q[0];

an arithmetic unit performing arithmetic to obtain d×P by repeatedly performing steps (1) through (4) a predetermined number of times based on data obtained by said obtaining unit $$Q[2]=ECDBL(Q[d[i]]) \qquad (1)$$

$$Q[1]=ECADD(Q[0],Q[1]) \qquad (2)$$

$$Q[0]=Q[2-d[i]] \qquad (3)$$

$$Q[1]=Q[1+d[i]] \qquad (4)$$

where an initial value of the register Q[0] is P, an initial value of the register Q[1] is 2×P, and a coefficient of a binary expression of a natural number d is d[i] (d[i]=0, 1), computing an X coordinate X3 and a Z coordinate Z3 of a point P3 of an elliptic curve addition ECADD P3=P1+P2 in a projective coordinate system by equations (5) and (6)

$$X3=Z3'\times[(X1\times X2-aZ1\times Z2)^2-4bZ1\times Z2(X1\times Z2+X2\times Z1)]; \text{ (\^{} indicates a power)} \qquad (5)$$

$$Z3=X3'\times[(X1\times Z2-X2\times Z1)^2] \qquad (6)$$

where an X coordinate of a point P1 is X1 and a Z coordinate is Z1, an X coordinate of a point P2 is X2 and a Z coordinate is Z2, an X coordinate of a point P3'=P1−P2 is X3' and a Z coordinate is Z3', Z3'≠0, and X1×Z2≠X2×Z1 in the projective coordinate system, computing an X coordinate and a Z coordinate of an elliptic curve doubling P4=2×P1 in the projective coordinate system by equations (7) and (8)

$$X4=[(X1^2-aZ1-2)^2-8bX1\times Z1^3] \qquad (7)$$

$$Z4=[4\times(X1\times Z1\times(X1^2+aXZ1^2)+b\times Z1^4)], \qquad (8)$$

and computing coordinates (X'[d]:Y'[d]:Z'[d]) of a point P[d]=d×P in the projective coordinate system by equations (9) through (11)

$$X'[d]=2y\times Z[d]^2\times Z[d+1]\times X[d] \qquad (9)$$

$$Y'[d]=Z[d+1]\times(y^2\times Z[d]^3+X[d]^3+aX[d]\times Z[d]^2+bZ[d]^3)-(x\times Z[d]-X[d])^2\times(x\times Z[d]\times Z[d+1]+X[d]\times Z[d+1]+X[d+1]\times Z[d]) \qquad (10)$$

$$Z'[d]=2y\times Z[d]^2\times Z[d+1]\times Z[d] \qquad (11)$$

where X[d]=x element of Q[0], Z[d]=y element of Q[0], X[d+1]=x element of Q[1], and Z[d+1]=y element of Q[1]);

a storage unit storing the d×P; and an encryption unit generating encrypted data using a result stored in the storage unit.

6. The apparatus according to claim 5, wherein said arithmetic unit performs:

arithmetic of an elliptic curve addition P3=P1+P2 in the projective coordinate system;

arithmetic of an elliptic curve doubling P4=2×P1 in the projective coordinate system; and arithmetic of obtaining coordinates (X'[d]:Y'[d]:Z'[d]) of P[d] in the projective coordinate system.

7. An elliptic curve cryptosystem apparatus, comprising:

an obtaining unit obtaining a coordinate of a point P on an elliptic curve over a finite field and an n-bit natural number d;

register Q[2];
register Q[1];
register Q[0];

an arithmetic unit performing arithmetic to obtain d×P by repeatedly performing steps (1) through (4) a predetermined number of times based on data obtained by said obtaining unit $$Q[2]=ECDBL(Q[d[i]]) \qquad (1)$$

$$Q[1]=ECADD(Q[0],Q[1]) \qquad (2)$$

$$Q[0]=Q[2-d[i]] \qquad (3)$$

$$Q[1]=Q[1+d[i]] \qquad (4)$$

where an initial value of the register Q[0] is P, an initial value of the register Q[1] is 2×P, and a coefficient of a binary expression of a natural number d is d[i] (d[i]=0, 1), computing an X coordinate X3 and a Z coordinate Z3 of an elliptic curve addition P3=P1+P2 in a projective coordinate system without using Y coordinates by equations (5) and (6)

$$X3 = Z3' \times [2(X1 \times Z2 + X2 \times Z1) \times (X1 \times X2 + aZ1 \times Z2) + 4bZ1^2 \times Z2^2] - X3' \times [(X1 \times Z2 - X2 \times Z1)^2] \quad (5)$$

$$Z3 = Z3' \times [(X1 \times Z2 - X2 \times Z1)^2] \quad (6)$$

where, in the projective coordinate system of an elliptic curve, an X coordinate of a point P1 is X1 and a Z coordinate is Z1, an X coordinate of a point P2 is X2 and a Z coordinate is Z2, an X coordinate of a point P3'=P1−P2 is X3' and a Z coordinate is Z3', Z3'≠0, and X1×Z2≠X2×Z1, computing an X coordinate and a Z coordinate of an elliptic curve doubling P4=2×P1 in the projective coordinate system without using a Y coordinate by equations (7) and (8)

$$X4 = [(X1^2 - aZ1^2)^2 - 8bX1 \times Z1^3]; (\hat{} \text{ indicates a power}) \quad (7)$$

$$Z4 = [4 \times (X1 \times Z1 \times (X1^2 + aZ1^2) + bZ1^4)] \quad (8)$$

where an X coordinate of P1 is X1 and a Z coordinate is Z1 in the projective coordinate system, and Z1≠0, and computing coordinates (X'[d]:Y'[d]:Z'[d]) of a point P[d]=d×P in the projective coordinate system by equations (9) through (11)

$$X'[d] = 2y \times Z[d]^2 \times Z[d+1] \times X[d] \quad (9)$$

$$Y'[d] = Z[d+1] \times (y^2 \times Z[d]^3 + X[d]^3 + aX[d] \times Z[d]^2 + bZ[d]^3) - (x \times Z[d] - X[d])^2 \times (x \times Z[d] \times Z[d+1] + X[d] \times Z[d+1] + X[d+1] \times Z[d]) \quad (10)$$

$$Z'[d] = 2y \times Z[d]^2 \times Z[d+1] \times Z[d] \quad (11)$$

where, in the projective coordinate system, an X coordinate of a point P[d] is X[d] and a Z coordinate is Z[d], and an X coordinate of P[d+1]=(d+1) P is X[d+1] and a Z coordinate is Z[d+1]);

a storage unit storing the d×P; and an encryption unit generating encrypted data using a result stored in the storage unit.

8. An elliptic curve cryptosystem apparatus, comprising:

an obtaining unit obtaining coordinates of a point P on an elliptic curve over a finite field and an n-bit natural number d;

register Q[2];
register Q[1];
register Q[0];

an arithmetic unit computing ECADDDBL by equations listed below $$T1 \leftarrow X1 \times X2 \quad (1)$$

$$T2 \leftarrow Z1 \times Z2 \quad (2)$$

$$T3 \leftarrow X1 \times Z2 \quad (3)$$

$$T4 \leftarrow X2 \times Z1 \quad (4)$$

$$T5 \leftarrow T3 + T4 (= X1 \times Z2 + X2 \times Z1) \quad (5)$$

$$T6 \leftarrow a \times T2 (= aZ1 \times Z2) \quad (6)$$

$$T7 \leftarrow T1 + T6 (= X1 \times X2 + aZ1 \times Z2) \quad (7)$$

$$T8 \leftarrow T5 \times T7 (= (X1 \times Z2 + X2 \times Z1)(X1 \times X2 + aZ1 \times Z2)) \quad (8)$$

$$T9 \leftarrow 2T8 (= 2(X1 \times Z2 + X2 \times Z1)(X1 \times X2 + aZ1 \times Z2)) \quad (9)$$

$$T10 \leftarrow T2^2 (= Z1^2 \times Z2^2) \quad (10)$$

$$T11 \leftarrow b \times T10 (= bZ1^2 \times Z2^2) \quad (11)$$

$$T12 \leftarrow 4T11 (= 4bZ1^2 \times Z2^2) \quad (12)$$

$$T13 \leftarrow T9 + T12 (= 2(X1 \times Z2 + X2 \times Z1)(X1 \times X2 + aZ1 \times Z2) + 4bZ1^2 \times Z2^2) \quad (13)$$

$$T14 \leftarrow T3 - T4 (= X1 \times Z2 - X2 \times Z1) \quad (14)$$

$$T15 \leftarrow T14^2 (= (X1 \times Z2 - X2 \times Z1)^2) \quad (15)$$

$$T16 \leftarrow Z3' \times T13 \quad (16)$$

$$T17 \leftarrow X3' \times T15 \quad (17)$$

$$X3 \leftarrow T16 - T17 \quad (18)$$

$$Z3 \leftarrow Z3' \times T15 \quad (19)$$

$$T21 \leftarrow T3^2 (= X1^2 \times Z2^2) \quad (20)$$

$$T22 \leftarrow T6 \times T2 (= aZ1^2 \times Z2^2) \quad (21)$$

$$T23 \leftarrow T21 - T22 (= X1^2 \times Z2^2 - aZ1^2 \times Z2^2) \quad (22)$$

$$T24 \leftarrow T23^2 (= (X1^2 \times Z2^2 - aZ1^2 \times Z2^2)^2) \quad (23)$$

$$T25 \leftarrow T11 \quad (24)$$

$$T26 \leftarrow T25 \times T2 (= bZ1^3 \times Z2^3) \quad (25)$$

$$T27 \leftarrow T26 \times T3 (= bX1 \times Z1^3 \times Z2^4) \quad (26)$$

$$T28 \leftarrow 8 \cdot T27 (= 8bX1 \times Z1^3 \times Z2^4) \quad (27)$$

$$X4 \leftarrow T24 - T28 \quad (28)$$

$$T29 \leftarrow T21 + T22 (= X1^2 \times Z2^2 + aZ1^2 \times Z2^2) \quad (29)$$

$$T30 \leftarrow T3 \times T29 (= X1 \times Z2(X1^2 \times Z2^2 + aZ1^2 \times Z2^2)) \quad (30)$$

$$T31 \leftarrow T30 + T26 \quad (31)$$

$$T32 \leftarrow T2 \times T31 \quad (32)$$

$$Z4 \leftarrow 4T32 \quad (33)$$

when following arithmetics are performed a predetermined number of times $$\text{if } d[i]=1, \text{ then swap}(Q[0], Q[1]) \quad (1)$$

$$\text{ECADDDBL}(Q[0], Q[1]) \quad (2)$$

(where Q[0]=(X1:Z1), Q[1]=(X2:Z2))

$$Q[1] = (X3:Z3) \quad (3)$$

$$Q[2] = (X4:Z4) \quad (4)$$

$$Q[0] = Q[2-d[i]] \quad (5)$$

$$Q[1] = Q[1+d[i]] \quad (6)$$

where an initial value of the register Q[0] is P, an initial value of the register Q[1] is 2×P, and a coefficient of a binary expression of a natural number d is d[i] (d[i]=0, 1)), wherein said arithmetic unit performs a conditional set of operations comprising storing an arithmetic result of the elliptic curve doubling ECDBL stored in the register Q[2] into the register Q[0] in step (5) and stores an arithmetic result of the elliptic curve addition ECADD stored in the register Q[1] in step (6) when d[i]=0; and stores the arithmetic result of the elliptic curve addition ECADD stored in the register Q[1] into the register Q[0] in step (5) and stores the arithmetic result of the elliptic curve doubling ECDBL stored in the register Q[2] into the register Q[1] in step (6) when d[i]=1; and an encryption unit generating encrypted data using the result stored in the register Q[1].

9. The elliptic curve cryptosystem apparatus according to claim 8, wherein
when Z3'=1, said arithmetic unit performs arithmetics by the equations (1) through (33) using Z3'=1.

10. A computer-readable storage medium storing an elliptic curve cryptosystem program, comprising:
obtaining coordinate of a point P on an elliptic curve over a finite field and an n-bit natural number d;
register Q[2];
register Q[1];
register Q[0];
concurrently performing, at said arithmetic unit, an elliptic curve addition ECADD and an elliptic curve doubling ECDBL when obtaining d×P by repeatedly performing steps (1) through (4) listed below a predetermined number of times based on the coordinates of the point P and the natural number d:

$$Q[2]=ECDBL(Q[d[i]]) \quad (1)$$

$$Q[1]=ECADD(Q[0],Q[1]) \quad (2)$$

$$Q[0]=Q[2-d[i]] \quad (3)$$

$$Q[1]=Q[1+d[i]] \quad (4)$$

where an initial value of the register Q[0] is P, an initial value of the register Q[1] is 2×P, and a coefficient of a binary expression of the obtained natural number d is d[i] (d[i]=0, 1),
wherein performing, at said arithmetic unit, a conditional set of operations comprising storing an arithmetic result of the elliptic curve doubling ECDBL stored in the register Q[2] into the register Q[0] in step (3) and stores an arithmetic result of the elliptic curve addition ECADD stored in the register Q[1] into the register [1] in step (4) when d[i]=0; and stores the arithmetic result of the elliptic curve addition ECADD stored in the register Q[1] into the register Q[0] in step (3) and stores the arithmetic result of the elliptic curve doubling ECDBL stored in the register Q[2] into the register Q[1] in step (4) when d[i]=1; and
generating encrypted data using the result stored in the register Q[1].

11. An arithmetic method for an elliptic curve cryptosystem, comprising:
obtaining coordinate of a point P on an elliptic curve over a finite field and an n-bit natural number d;
register Q[2];
register Q[1];
register Q[0];
performing arithmetic to obtain d×P by concurrently performing an elliptic curve addition ECADD and an elliptic curve doubling ECDBL by repeatedly performing steps (1) through (4) listed below a predetermined number of times based on the coordinates of the point P and the natural numbered:

$$Q[2]=ECDBL(Q[d[i]]) \quad (1)$$

$$Q[1]=ECADD(Q[0],Q[1]) \quad (2)$$

$$Q[0]=Q[2-d[i]] \quad (3)$$

$$Q[1]=Q[1+d[i]] \quad (4)$$

where an initial value of the register Q[0] is P, an initial value of the register Q[1] is 2×P, and a coefficient of a binary expression of the obtained natural number d is d[i] (d[i]=0, 1)), wherein said performing arithmetic performing a conditional set of operations comprising storing an arithmetic result of the elliptic curve doubling ECDBL stored in the register Q[2] into the register Q[0] in step (3) and stores an arithmetic result of the elliptic curve addition ECADD stored in the register Q[1] into the register [1] in step (4) when d[i]=0; and stores the arithmetic result of the elliptic curve addition ECADD stored in the register Q[1] into the register Q[0] in step (3) and stores the arithmetic result of the elliptic curve doubling ECDBL stored in the register Q[2] into the register Q[1] in step (4) when d[i]=1; and
generating encrypted data using the result stored in the register Q[1].

12. A method of elliptic curve cryptosystem processing, comprising:
inputting coordinates of a point P on an elliptic curve and an n-bit natural number d;
register Q[2];
register Q[1];
register Q[0];
concurrently performing, at an arithmetic unit, an elliptic curve addition and an elliptic curve doubling when obtaining d×P,
wherein performing, at said arithmetic unit, a conditional set of operations comprising storing an arithmetic result of the elliptic curve doubling ECDBL stored in the register Q[2] into the register Q[0] and stores an arithmetic result of the elliptic curve addition ECADD stored in the register Q[1] when d[i]=0; and stores the arithmetic result of the elliptic curve addition ECADD stored in the register Q[1] into the register Q[0] and stores the arithmetic result of the elliptic curve doubling ECDBL stored in the register Q[2] into the register Q[1] when d[i]=1; and
generating encrypted data using the result stored in the register Q[1].

* * * * *

UNITED STATES PATENT AND TRADEMARK OFFICE
CERTIFICATE OF CORRECTION

PATENT NO. : 7,505,587 B2  Page 1 of 1
APPLICATION NO. : 10/315244
DATED : March 17, 2009
INVENTOR(S) : Tetsuya Izu et al.

It is certified that error appears in the above-identified patent and that said Letters Patent is hereby corrected as shown below:

Column 22, Line 50 (Equation 5), change "$[x3'x$" to --$[x3'\ x$--.

Column 23, Line 19 (Equation 19), change "$x3==$" to --$x3=$--.

Column 23, Line 26, change "$2x$" to --$\hat{\ }2x$--.

Column 28, Line 9, change "numbered:" to --number d:--.

Signed and Sealed this

Thirtieth Day of June, 2009

JOHN DOLL
*Acting Director of the United States Patent and Trademark Office*